(12) United States Patent
Komarla et al.

(10) Patent No.: US 7,207,039 B2
(45) Date of Patent: Apr. 17, 2007

(54) SECURE BOOTING AND PROVISIONING

(75) Inventors: Eshwari P. Komarla, Karnataka (IN); Vincent J. Zimmer, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 437 days.

(21) Appl. No.: 10/746,975

(22) Filed: Dec. 24, 2003

(65) Prior Publication Data

US 2005/0149924 A1 Jul. 7, 2005

(51) Int. Cl.
G06F 9/445 (2006.01)

(52) U.S. Cl. .................... 717/178; 717/172; 713/2

(58) Field of Classification Search ........ 717/168–178; 713/2
See application file for complete search history.

(56) References Cited

FOREIGN PATENT DOCUMENTS

WO      WO 00/54149     *  9/2000

OTHER PUBLICATIONS

Information Technology—SCSI Controller Commands-2 (SCC-2); NCITS.318:1998; dpANS T10 Project 1225D Rev.4 dated Sep. 12, 1997; http://www.t10.org; 24 pp.

IEEE Standard for Information Technology 802.3, Part 3: Carrier Sense Multiple Access with Collision Detection (CSMA/CD) Access Method and Physical Layer Specifications; Institute of Electrical and Electronics Engineers, Inc., Mar. 8, 2002; 33 pp.

IEEE Std. 802.11b-1999, "Wireless LAN Medium Access Control (MAC) and Physical Layer (PHY) Specifications . . . ," Institute of Electrical and Electronics Engineers, Inc., Sep. 16, 1999; 17 pp.

Weber, et al., "Fibre Channel (FC) Frame Encapsulation," Network Working Group, RFC:3643, Dec. 2003; 17 pp.

Information Sciences Institute, "Internet Protocol: DARPA Internet Program Protocol Specification," RFC:791, Sep. 1981, 43 pp.

Information Sciences Institute, "Transmission Control Protocol: DARPA Internet Program Protocol Specification," RFC:793, Sep. 1981, 80 pp.

Croft, et al. "Bootstrap Protocol (BOOTP)," Network Working Group, RFC:951, Sep. 1985, 12 pp.

Sollins, K. "The TFTP Protocol (Rev. 2)," Network Working Group, RFC:1350, Jul. 1992, 11 pp.

Droms, R. "Dynamic Host Configuration Protocol," Network Working Group, RFC:2131, Mar. 1997, 45 pp.

Borenstein, et al. "MIME Multipurpose Internet Mail Extensions) Part One: Mechanisms for Specifying and Describing the Format of Internet Message Bodies," Network Working Group, RFC:1521, Sep. 1993, 69 pp.

Krueger, et al. "Small Computer Systems Interface protocol over the Internet (iSCSI) Requirements and Design Considerations," Network Working Group, RFC:3347, Jul. 2002, 23 pp.

(Continued)

Primary Examiner—Ted T. Vo
(74) Attorney, Agent, or Firm—Janaki K. Davda; Konrad Raynes & Victor LLP

(57) ABSTRACT

Provided are techniques for booting and provisioning a platform connected to a boot and provisioning server including a server boot and provisioning system. The server boot and provisioning system receives a platform identifier, selects a platform specific boot image based on the platform identifier in response to determining that the platform identifier is valid, and selects a platform specific configuration profile based on the platform identifier in response to determining that the platform identifier is valid. Also provided are techniques for booting and provisioning a platform connected to a boot and provisioning server, wherein the platform includes a platform boot and provisioning system.

24 Claims, 19 Drawing Sheets

OTHER PUBLICATIONS

PCI Specifications, PCI-SIG 2004; web pages including Mar. 20, 2002 news release "PCI-SIG Releases New PCI Version 2.3 Local Bus Specification for Migration to Low-Voltage Designs,"(PCI Special Interest Group , PCI Local Bus Specification, Rev 2.3, published Mar. 2002); http://www.pcisig.com/specifications/order form;18 pp.

Anderson, Don, et al., eds. "PCI System Architecture," 4th ed.; TOC pp. v-xlii; Intro. pp. 1-6; Chapter 1 pp. 7-13; Chapter 2 pp. 15-21; 1999.

Serial ATA: High Speed Serialized AT Attachment, Rev. 1.0; Serial ATA Workgroup, Aug. 29, 2001; 36 pp.

N1: Revolutionary IT Architecture for Business, webpage copyright 1994-2003 sun.com; http://www.sun.com/software/solutions/n1; printed Nov. 24, 2003; 2 pp.

Information Technology—SCSI Architecture Model—2 (SAM-2), dpANS T10 Project 1157-D, Rev. 24, Sep. 12, 2002; 80 pp.

How to Get T10 Draft Standards (and other Publications), web page dated Dec. 19, 2003; 3 pp.

Serial ATA Specs and Design Guides (SATA 1.0a Specification, published Feb. 4, 2003); http://www.serialata.com; 2 pp.

What is TCG? web page copyright 2003 The TCG; https://www.trustedcomputinggroup.org/home; printed Nov. 24, 2003; 1 p.

Wired for Management Development Tools, web page copyright 2003 Intel Corporation; http://www.intel.com/labs/manage/wfm/tools/pxepdk20; printed Nov. 24, 2003; 1 p.

RedBoot Overview, web page copyright 2003 eCosCentric Limited; http://www.ecoscentric.com/ecos/redboot.shtml; printed Nov. 24, 2003; 1 p.

Extensible Firmware Interface Specification Overview, web page copyright 2003 Intel Corporation; http://www.intel.com/technology/efi/main_specification.htm; printed Dec. 19, 2003; 3 pp.

Extensible Firmware Interface Overview, web page copyright 2003 Intel Corporation; http://developer.intel.com/technology/efi; printed Nov. 24, 2003; 1 p.

Intel® Boot Integrity Services (BIS), web page copyright 2003 Intel Corporation; http://www.intel.com/labs/manage/wfm/tools/bis; printed Nov. 24, 2003; 2 pp.

Intel® Processors Overview, web page copyright 2003 Intel Corporation; http://www.intel.com/design/iio; printed Nov. 24, 2003; 2 pp.

Intel® Platform Innovation Framework for EFI Overview, web page copyright 2003 Intel Corporation; http://www.intel.com/technology/framework; printed Nov. 24, 2003; 1 p.

Microsoft Dynamic Systems Initiative, web page copyright 2003 Microsoft Corporation; http://www.microsoft.com/downloads/details.aspx?FamilyID=e5ce0eb3-b7ce-40fd-b1be-fb7a0f823ff5&displaylang=en; printed Nov. 24, 2003; 1 p.

What is Preboot Execution Environment (PXE)? web page copyright 2002 Argon Technology Corporation; http://www.pxe.ca; printed Nov. 26, 2003; 1 p.

Boot Integrity Services Application Programming Interface, v. 1.0; Intel Corporation, Dec. 28, 1998, 64 pp.

Common Security: CDSA and CSSM, Version 2.3; Technical Standard, The Open Group, May 2000; Preface and TOC, pp. i-xxxviii; text, 994 pp.

* cited by examiner

I/O Processor 210

Address Space 250

Platform Boot and Provisioning System 256

FIG. 2C

SECURE BOOTING AND PROVISIONING

BACKGROUND

1. Field

The disclosure relates to techniques for secure booting and provisioning.

2. Description of the Related Art

In conventional systems, storage platforms use firmware, such as Redboot™ firmware, in order to startup a storage platform or embed an operating system into the storage platform. RedBoot™ firmware provides a bootstrap environment for embedded systems. RedBoot™ firmware allows download and execution of embedded applications and allows applications to be stored in FLASH memory and then executed. RedBoot™ firmware may retrieve Internet Protocol (IP) (Internet Engineering Task Force (IETF) Request for Comments (RFC) 791), published September 1981) parameters via a Bootstrap Protocol (BOOTP) (IETF RFC 951, published September 1985), Dynamic Host Configuration Protocol (DHCP) (IETF RFC 2131, published March 1987) or Flash memory, and program images may be downloaded using Trivial File Transfer Protocol (TFTP) (IETF RFC 1350, Revision 2, published July 1992). Also, some conventional systems in manufacturing use some primitive firmware environments or operating-system present applications.

Conventional approaches are limited by a lack of security and ability to load operating systems across wide-area networks. In particular, conventional systems are limited by fixed configuration of a given operating system flashed into Flash memory at the storage platform. Also, since Flash memory is expensive, having to have all of the operating systems on each storage platform is very expensive.

With the advent of modular, blade computing and the associated initiatives, such as Sun N1 from Sun Microsystems, autonomic computing from International Business Machines Corporation, and the Microsoft® Dynamic Systems Initiative, there is a need for system components to be provisioned and repurposed based on demand profile and changing system requirements.

In conventional systems, storage platforms use non-standard, proprietary firmware and operating systems. This lack of standardization makes reuse of components expensive across different product lines. This fixed configuration makes it difficult to re-provision or update the storage platform in the field. Moreover, in conventional systems, different platforms have different software interfaces and manageability.

Therefore, there is a need in the art for improved secure booting and provisioning.

BRIEF DESCRIPTION OF THE DRAWINGS

Referring now to the drawings in which like reference numbers represent corresponding parts throughout:

FIG. 2C illustrates further details of an I/O processor in accordance with certain embodiments;

DETAILED DESCRIPTION OF THE EMBODIMENTS

In the following description, reference is made to the accompanying drawings which form a part hereof and which illustrate several embodiments. It is understood that other embodiments may be utilized and structural and operational changes may be made without departing from the scope of embodiments.

Figure 1A:
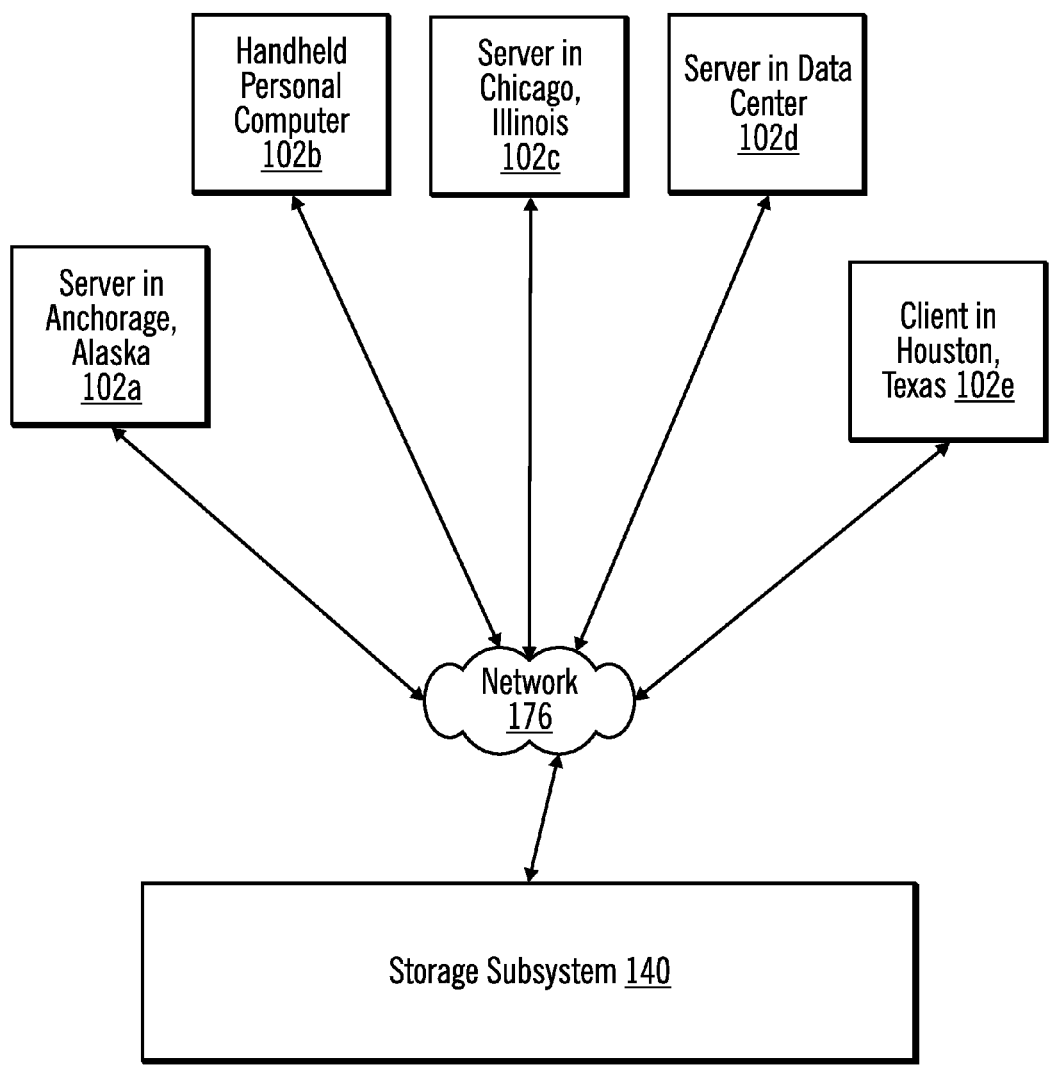
FIG. 1A illustrates a computing environment in which certain embodiments are implemented.

FIG. 1A illustrates a computing environment in which certain embodiments may be implemented. Various computing devices 102a, 102b, 102c, 102d, and 102e are connected via a network 176 to a storage subsystem 140. The computing devices may be, for example, a server in Anchorage, Ak. 102a, a handheld personal computer 102b, a server in Chicago, Ill. 102c, a server in a data center 102d, and a client in Houston, Tex. 102e. Network 176 may be, for example, a Local Area Network (LAN), the Internet, a Wide Area Network (WAN), Storage Area Network (SAN), WiFi (Institute of Electrical and Electronics Engineers (IEEE) 802.11b, published Sep. 16, 1999), Wireless LAN (IEEE 802.11b, published Sep. 16, 1999), etc. That is, the storage subsystem 140 is connected to network attached client and server computing devices 102a, 102b, 102c, 102d, and 102e issuing I/O requests.

Figure 1B:
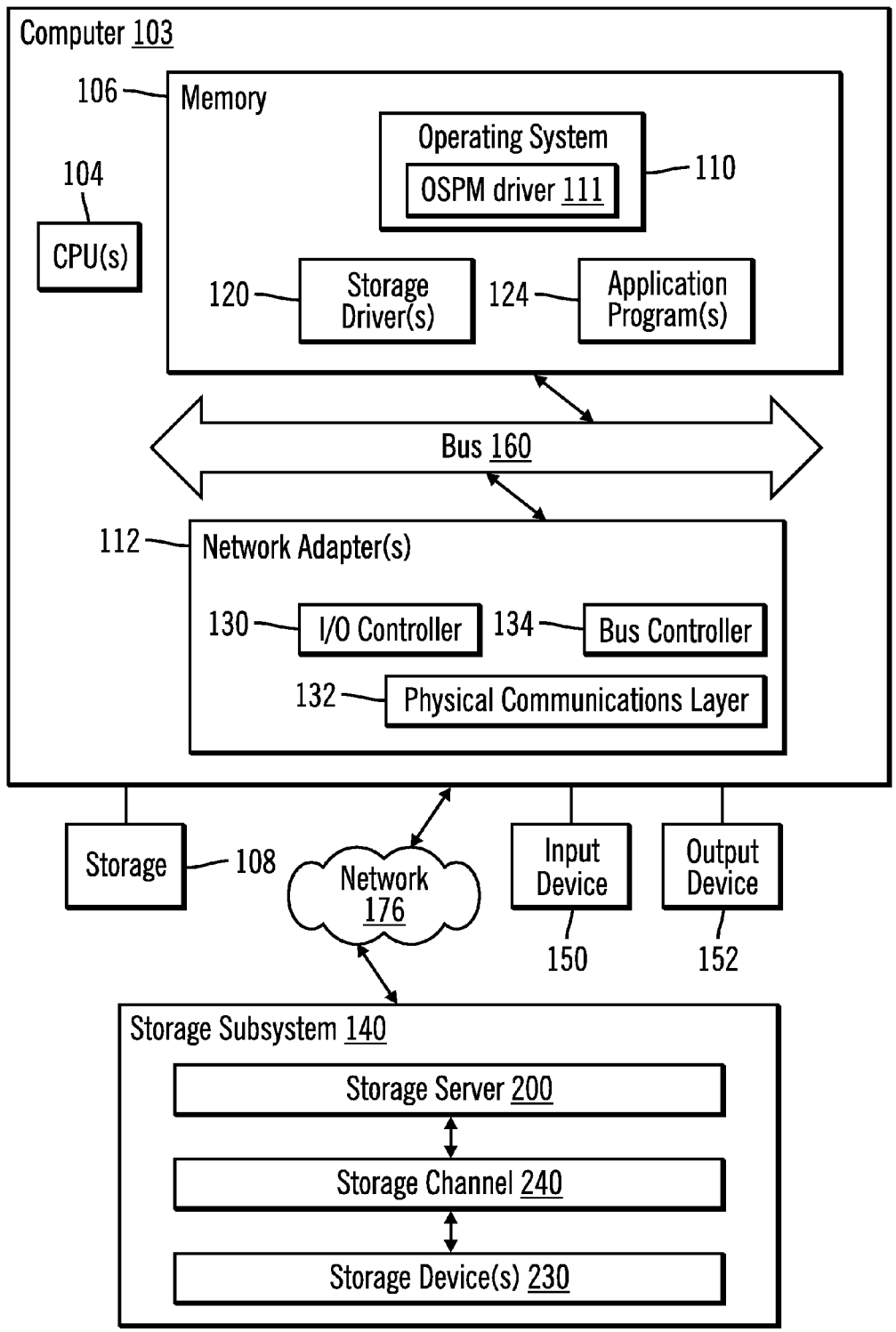
FIG. 1B illustrates further details of a computing environment in which certain embodiments may be implemented.

FIG. 1B illustrates further details of a computing environment in which certain embodiments may be implemented. A host computer 103 includes one or more central processing units (CPUs) 104, a volatile memory 106, non-volatile storage 108 (e.g., magnetic disk drives, optical disk drives, a tape drive, etc.), an operating system 110, and one or more network adapters 128. The operating system 110 may include operating system drivers, such as an Operating System Power Management (OSPM) driver 111. One or more storage drivers 120 and one or more application programs 124 further execute in memory 106 and are capable of transmitting and retrieving packets from remote storage subsystem 140 over the network 176.

The host computer 102e may comprise any computing device known in the art, such as a mainframe, server, personal computer, workstation, laptop, handheld computer, telephony device, network appliance, virtualization device, storage controller, etc. Computing devices 102a, 102b, 102c, 102d, and/or 102e may implement the architecture of host computer 104. Any CPU 104 and operating system 110 known in the art may be used. Programs and data in memory 106 may be swapped into storage 108 as part of memory management operations.

The storage subsystem 140 includes a storage server 200 (i.e., a type of computing device) connected to a storage channel 240, which is connected to one or more storage devices 230 (e.g., disk drives that are part of a Redundant Array of Independent Disks (RAID) system). Storage devices 230 may also be referred to as an I/O subsystem 230.

Each network adapter 128 includes various components implemented in the hardware of the network adapter 112. Each network adapter 112 is capable of transmitting and receiving packets of data over network 176.

Each storage driver 120 executes in memory 106 and includes network adapter 112 specific commands to communicate with each network adapter 112 and interface between the operating system 110 and each network adapter 112. Each network adapter 112 or storage driver 120 implements logic to process the packets, such as a transport protocol layer to process the content of messages included in the packets that are wrapped in a transport layer, such as Transmission Control Protocol (TCP) (IETF RFC 793, published September 1981) and/or Internet Protocol (IP) (IETF RFC 791, published September 1981), the Internet Small Computer System Interface (iSCSI) (IETF RFC 3347, published February 2003), Fibre Channel (IETF RFC 3643, published December 2003), or any other transport layer protocol known in the art. The transport protocol layer unpacks the payload from the received Transmission Control Protocol/Internet Protocol (TCP/IP) packet and transfer the data to a storage driver 120 to return to the application program 124. Further, an application program 124 transmitting data transmits the data to a storage driver 120, which then sends the data to the transport protocol layer to package in a TCP/IP packet before transmitting over the network 176.

A bus controller 134 enables each network adapter 112 to communicate on a computer bus 160, which may comprise any bus interface known in the art, such as a Peripheral Component Interconnect (PCI) bus (PCI Special Interest Group, PCI Local Bus Specification, Rev 2.3, published March 2002), Small Computer System Interface (SCSI) (American National Standards Institute (ANSI) SCSI Controller Commands-2 (SCC-2) NCITS. 318:1998), Serial ATA ((SATA 1.0a Specification, published Feb. 4, 2003), etc. The network adapter 112 includes a network protocol for implementing a physical communication layer 132 to send and receive network packets to and from remote data storages over a network 176. In certain embodiments, the network adapter 112 may implement the Ethernet protocol (IEEE std. 802.3, published Mar. 8, 2002), Fibre Channel (IETF RFC 3643, published December 2003), or any other network communication protocol known in the art.

The network adapter 112 includes an Input/Output (I/O) controller 130. In certain embodiments, the I/O controller 130 may comprise Internet Small Computer System Interface (iSCSI controllers), and it is understood that other types of network controllers, such as an Ethernet Media Access Controller (MAC) or Network Interface Controller (NIC), or cards may be used.

The storage 108 may comprise an internal storage device or an attached or network accessible storage. Programs in the storage 108 are loaded into the memory 106 and executed by the CPU 104. An input device 150 is used to provide user input to the CPU 104, and may include a keyboard, mouse, pen-stylus, microphone, touch sensitive display screen, or any other activation or input mechanism known in the art. An output device 152 is capable of rendering information transferred from the CPU 104, or other component, such as a display monitor, printer, storage, etc.

In certain embodiments, in addition to one or more storage drivers 120, the host computer 103 may include other drivers, such as a transport protocol driver (not shown) that performs the functions of the transport protocol layer.

The network adapter 112 may include additional hardware logic to perform additional operations to process received packets from the computer 103 or the network 176. Further, the network adapter 112 may implement a transport layer offload engine (TOE) to implement the transport protocol layer in the network adapter as opposed to the computer storage driver 120 to further reduce host computer processing burdens. Alternatively, the transport layer may be implemented in the storage driver 120.

Various structures and/or buffers (not shown) may reside in memory 106 or may be located in a storage unit separate from the memory 106 in certain embodiments.

Figure 2A:
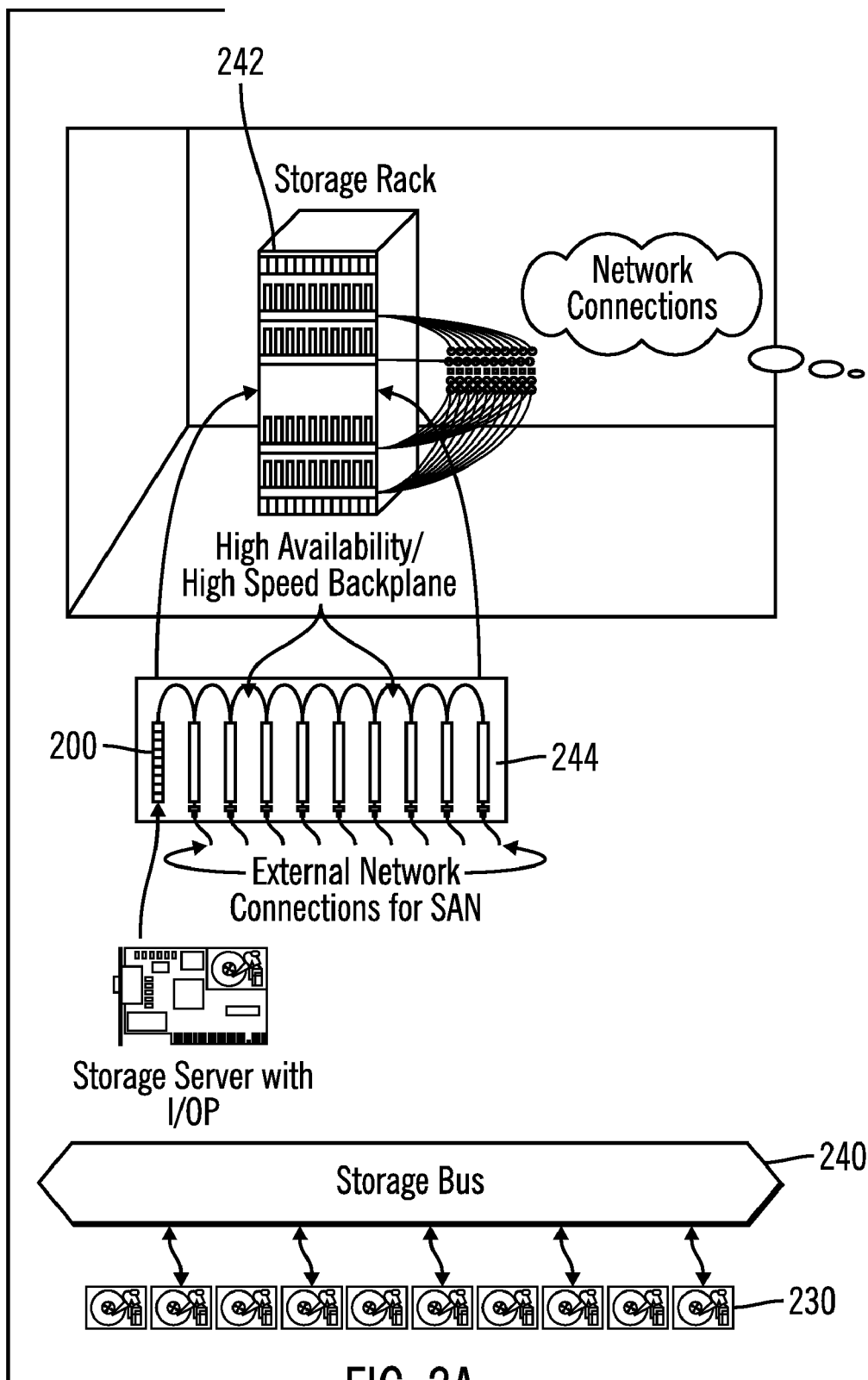
FIG. 2A illustrates a storage rack in accordance with certain embodiments.
Figure 2B:
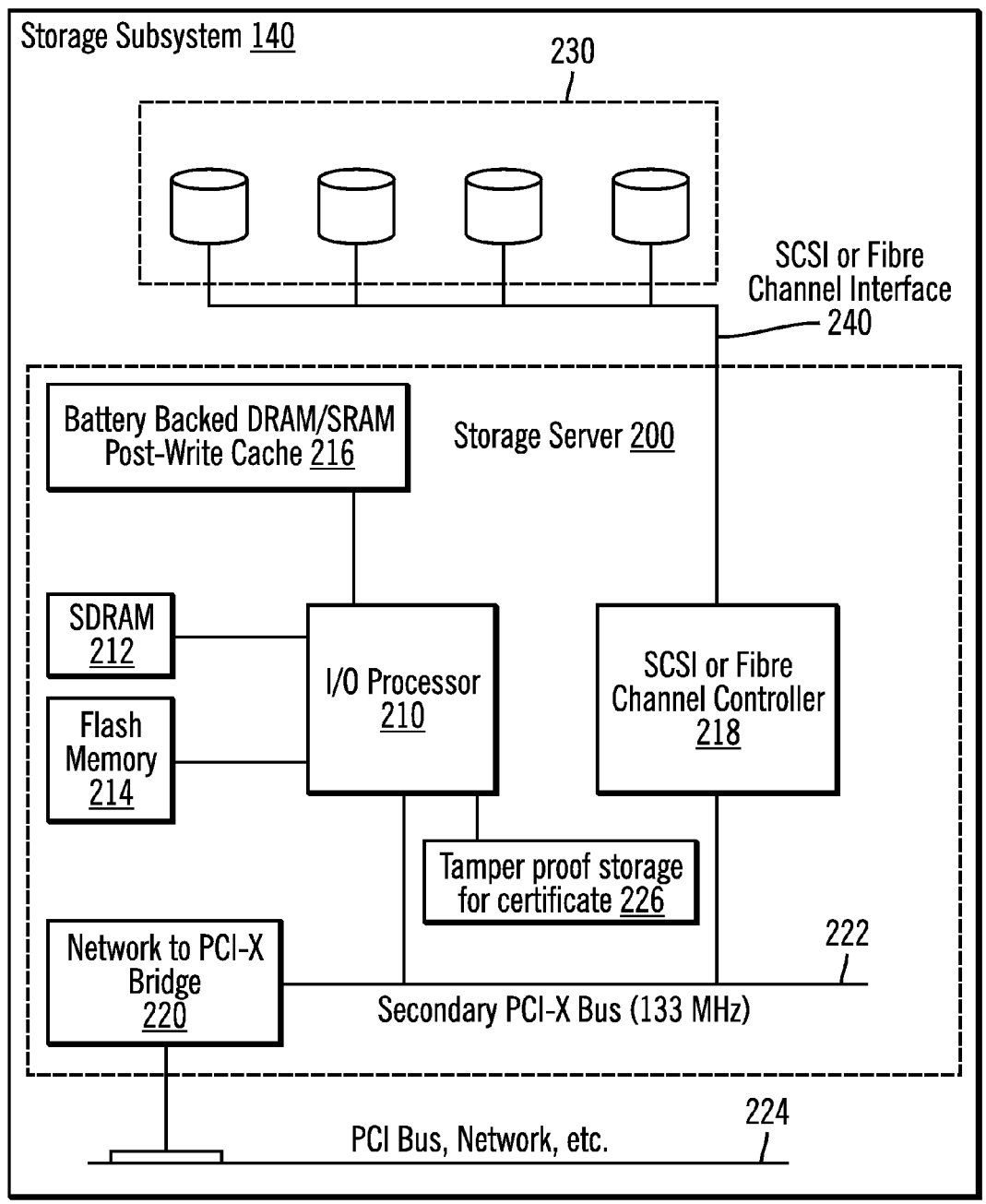
FIG. 2B illustrates further details of a storage subsystem in accordance with certain embodiments.

FIG. 2A illustrates a storage rack 242 in accordance with certain embodiments. The storage rack 242 includes a high availability, high speed backplane for external network connections for servers on a Storage Area Network (SAN). At least one of the servers is a storage server 200 with an I/O processor that is connected to a storage bus (i.e., a type of storage connection 240), which is connected to storage devices 230. In FIG. 2B, there is an aggregation of storage units. Additionally, one of the servers in the storage rack 242 is a boot and provisioning server 244. FIG. 2A provides an example of an enterprise storage topology with network attached storage (NAS) to demonstrate how certain embodiments may be extended into an enterprise domain that spans Storage Area Networks (SANs) and storage servers with I/O processors.

FIG. 2B illustrates further details of a storage subsystem 140 in accordance with certain embodiments. The storage subsystem 140 includes storage server 200, a Small Computer Systems Interface (SCSI) or Fibre channel interface (i.e., types of communication paths 240), and storage devices 230. The storage server 200 includes an I/O processor 210. Certain embodiments are implemented in an Intel® XScale™ I/O processor available from Intel Corporation. In certain embodiments, the I/O subsystem 230 is controlled by the I/O processor 210. In certain embodiments, the storage devices 230 may be described as a NAS unit. In certain embodiments, the I/O processor 210 may be resident on a motherboard of the storage server 200 or is part of a chipset. The I/O processor 210 is an intelligent processor with an operating environment specialized for storage (e.g., the I/O processor 210 includes firmware/software for applications such as RAID and iSCSI systems). The I/O processor 210 manages data transfer from the storage devices 130 to the host computer 103 CPU 140 and vice-versa. In certain embodiments, the I/O processor 210 is attached to a wide-area network (WAN), such as the Internet, and communicates with clients via an iSCSI protocol.

The storage server 200 also includes Synchronous Dynamic Random Access Memory (SDRAM) 212 and Flash memory 214 for use by the I/O processor 210. A section of memory (cache 216) managed by the I/O processor 210 is battery-backed, thus allowing for use as a post-write cache (i.e., for storing write transactions and acting as a buffer cache). Cache 216 may be, for example, Dynamic Random Access Memory (DRAM) or Static Random Access Memory (SRAM). The I/O processor 210 is also connected to a tamper proof storage 226 that may be used to store a certificate. The certificate includes a public key used for decrypting a document, tag, etc. that is encrypted with a corresponding private key. A SCSI or Fibre channel controller 218 is used to connect to SCSI or Fibre channel interface 240. In certain embodiments, Integrated Drive Electronics (IDE) may be used instead of or in addition to channel controller 218. Also, a network to PCI-X bridge 220 is connected to the I/O processor 210 and channel controller 218 via a secondary PCI-X bus 222 (e.g., of 133 MHz) and is connected to a PCI bus, a network, host computer 103, etc. via communication path 224.

FIG. 2C illustrates further details of an I/O processor 210 in accordance with certain embodiments. The I/O processor 210 includes address space 250 and a platform boot and provisioning system 256. In certain embodiments, the platform boot and provisioning system 256 is implemented in firmware in a Read Only Memory (ROM) (not shown). In certain alternative embodiments, the platform boot and provisioning system 256 may be implemented in software, hardware, or a combination of software, firmware, and/or hardware.

Figure 2D:
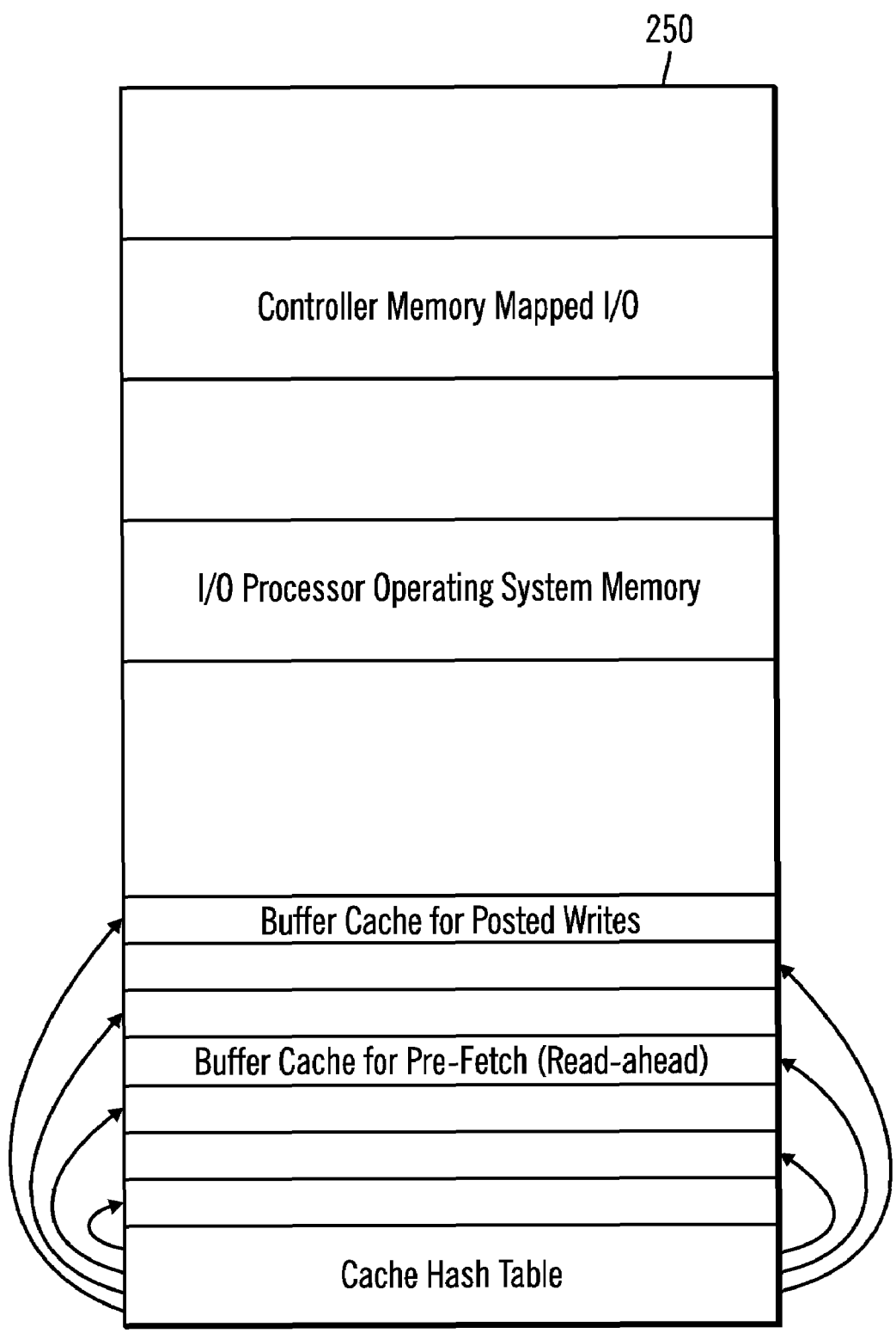
FIG. 2D illustrates further details of an address space usage for the I/O processor in accordance with certain embodiments.

FIG. 2D illustrates further details of an address space 250 usage for the I/O processor 210 in accordance with certain embodiments. The address space 250 includes controller memory mapped I/O for use by the channel controller 218, I/O processor operating system memory for use by the I/O processor 210, a buffer cache for posted writes for use by cache 216, a buffer cache for pre-fetch (i.e., for read-ahead), and a cache hash table.

Figure 3:
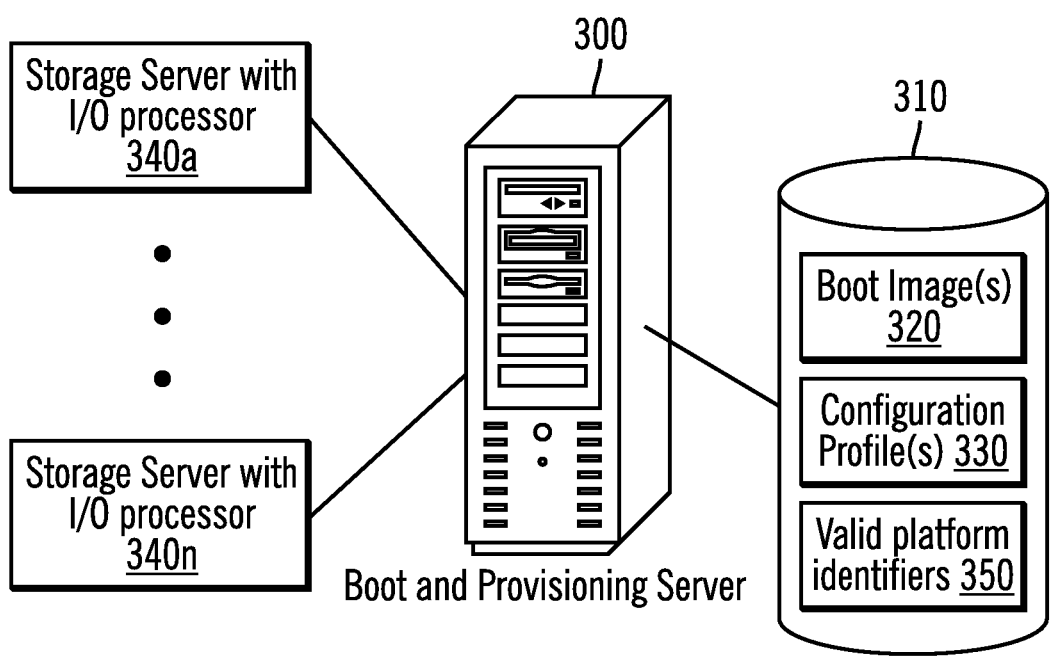
FIG. 3 illustrates a boot and provisioning server in accordance with certain embodiments.

FIG. 3 illustrates a boot and provisioning server 300 in accordance with certain embodiments. Multiple storage servers with I/O processors 340a . . . 340n may be connected to the boot and provisioning server 300. The boot and provisioning server 300 is connected to a data store 310 that stores at least one boot image 320, at least one configuration profile 330, and at least one valid platform identifier 350. A boot image 320 may be used to "boot up" a storage server with an I/O processor 340a . . . 340n. A configuration profile 330 may be used to provision storage devices connected to a storage server with an I/O processor 340a . . . 340n. The term "provisioning" may be described as configuring a storage device using a prescribed policy.

Figure 4A:
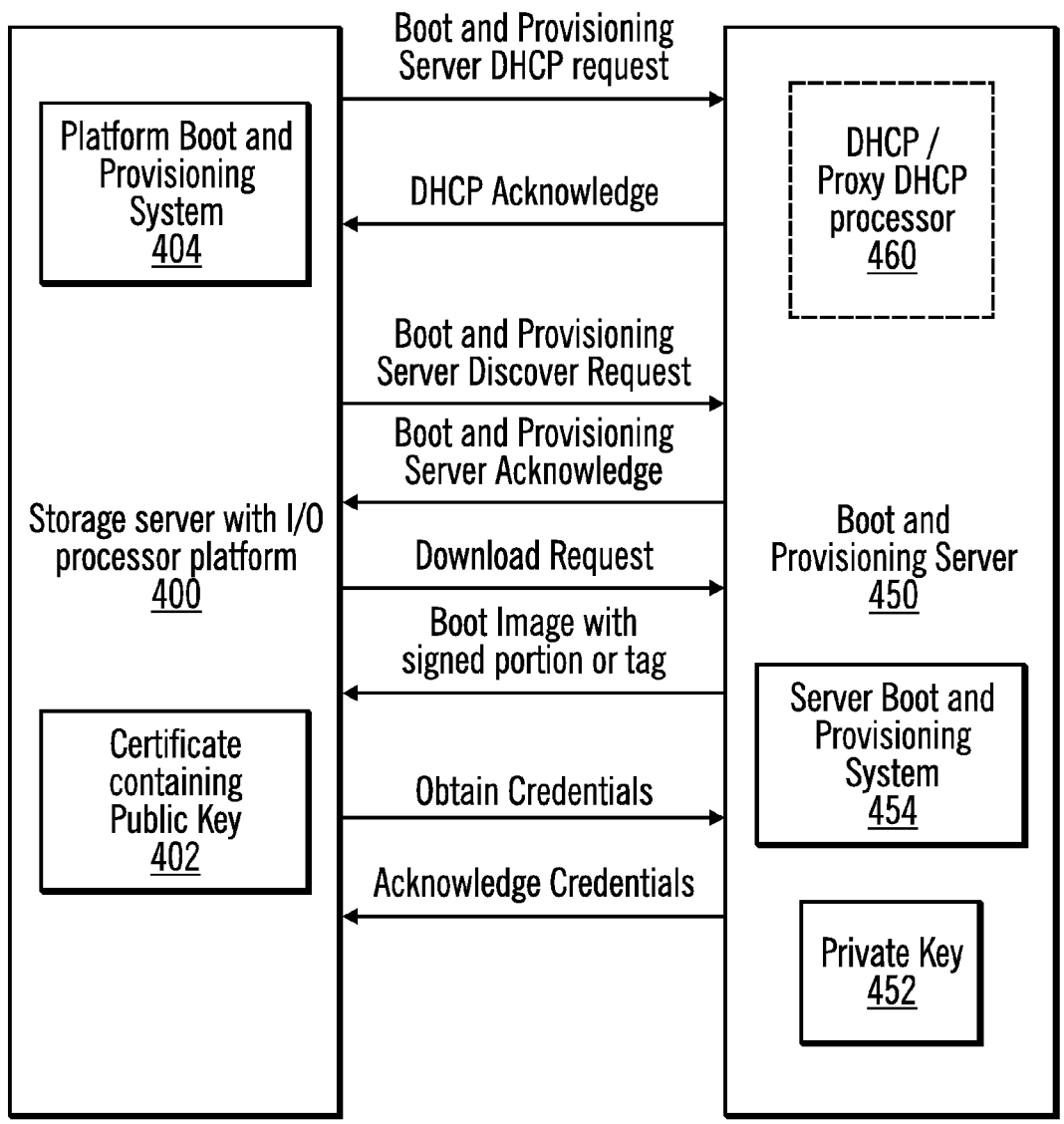
FIGS. 4A, 4B, and 4C illustrate the interaction between a storage server with an I/O processor platform and a boot and provisioning server in accordance with certain embodiments.
Figure 4B:
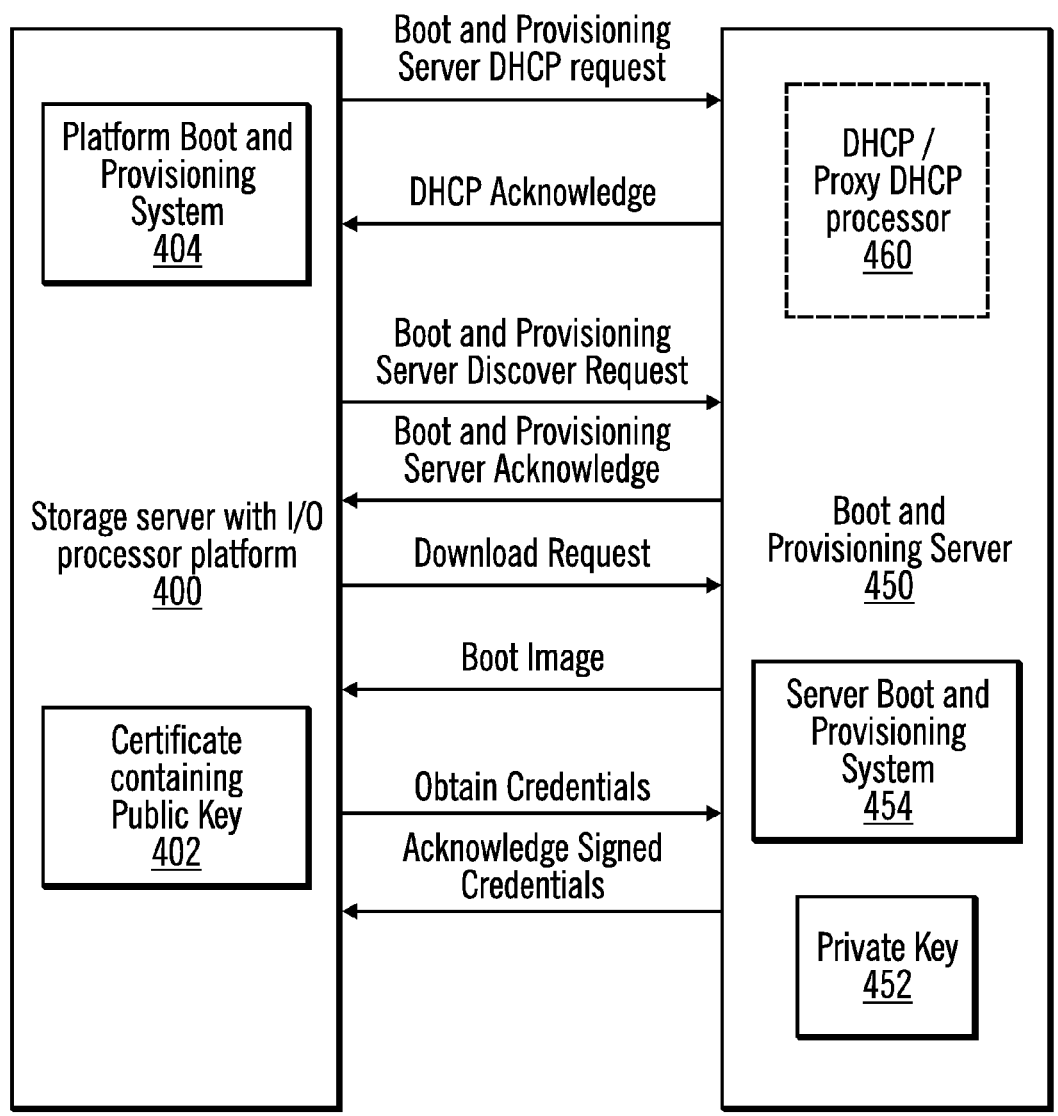
Figure 4C:
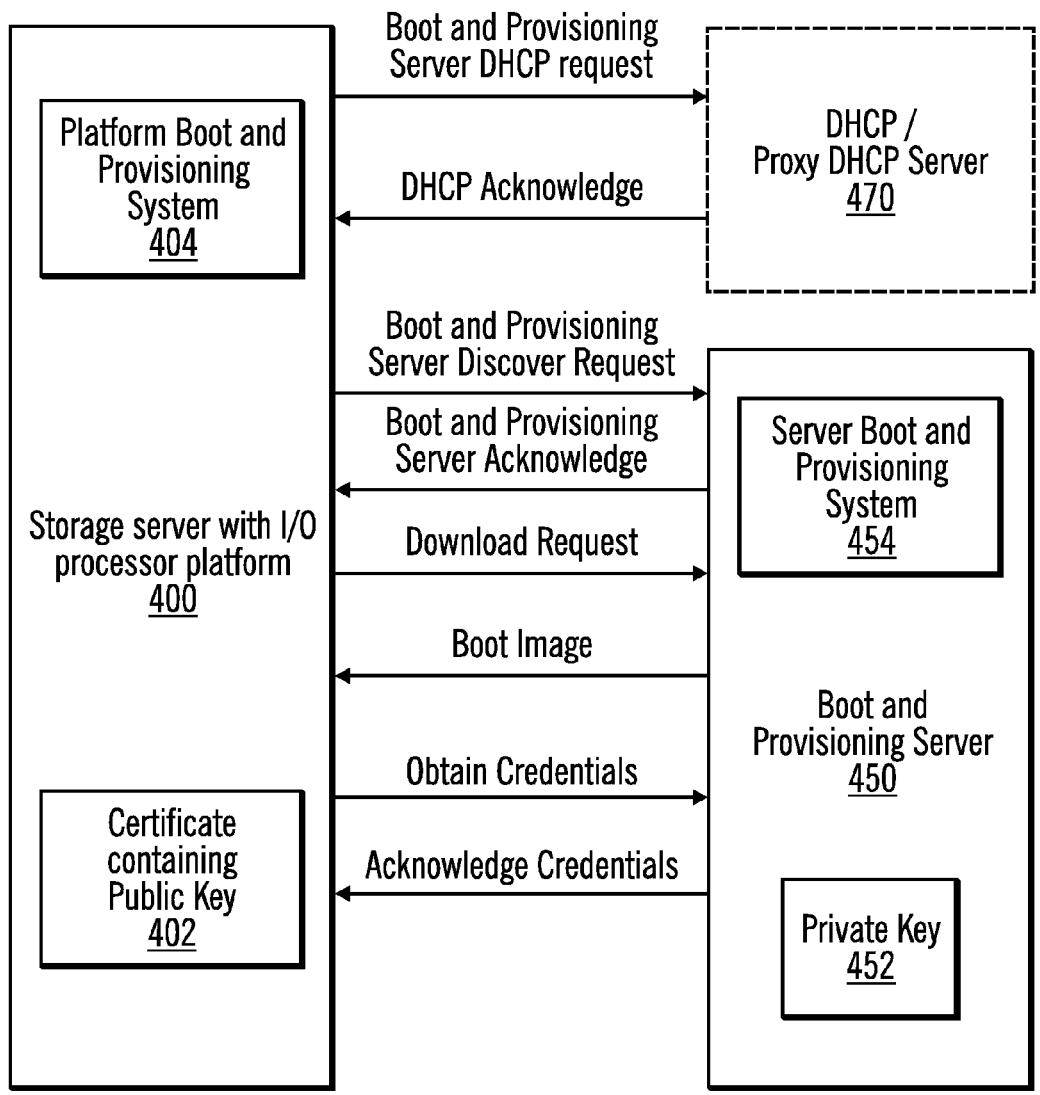

FIGS. 4A, 4B, and 4C illustrate the interaction between a storage server with an I/O processor platform 400 and a boot and provisioning server 450 in accordance with certain embodiments. A storage server with an I/O processor platform 400 includes a certificate containing a public key 402 and includes a platform boot and provisioning system 404 (e.g., as part of the I/O processor 210). The term "platform" may be described as a storage server including an I/O processor connected to storage devices and network-attached storage (NAS). A NAS device may be described as a server that is dedicated to file sharing and provides additional storage (e.g., to the storage server including the I/O processor).

The boot and provisioning server 450 includes a private key 452 that corresponds to the public key in certificate 402. If at least a portion of a document or a tag is "signed" (i.e., encrypted) with the private key 452, the signed portion or tag may be decrypted with the public key 402. In certain embodiments, the boot and provisioning server 450 is a PXE server (PXE Version 2.1, Intel Corporation, published Sep. 20, 1999). The boot and provisioning server 450 also includes server boot and provisioning system 454, which may be implemented in software, hardware, or a combination of software, firmware, and/or hardware.

Thus, in certain embodiments, new functionality is added to the I/O processor 210 with the platform boot and provisioning system 404 and new functionality is added to the boot and provisioning server 400 with the server boot and provisioning system 454.

In certain embodiments (e.g., those illustrated in FIGS. 4A and 4B), DHCP/proxy DHCP processor 460 is included as part of the boot and provisioning server 450. In certain embodiments (e.g., that illustrated in FIG. 4C), DHCP/proxy DHCP server 470 is a separate server from the boot and provisioning server 450. The DHCP/proxy DHCP processor 460 and server 470 process DHCP requests and return IP addresses.

With reference to FIG. 4A, the storage server with I/O processor platform 400 ("platform 400"), submits a boot and provisioning server DHCP request to the DHCP/proxy DHCP processor 460. The DHCP/proxy DHCP processor 460 returns an acknowledgment with an IP address of the boot and provisioning server 450. Then, the platform 400 performs a boot and provisioning server 450 discover request (e.g., to determine whether the boot and provisioning server 450 is available). The server boot and provisioning system 454 returns an acknowledgment to the platform 400. The platform 400 submits a download request to the server boot and provisioning system 454 for a boot image.

Each platform 400 has a platform identifier. In certain embodiments, the platform identifier may be a Globally-Unique Identification (GUID) as defined by the EFI specification (EFI Version 1.10 Intel Corporation, published Jan. 7, 2003) and/or a stronger identification, such as a public key associated with a Trusted Platform Module (e.g., one in compliance with a Trusted Computing Group Alliance (TCGA) specification). In certain embodiments, the public key used as an identifier is not the public key 402 used for decryption. The platform identifier of platform 400 may be used by the server boot and provisioning system 454 to select a boot image (e.g., to select a type of operating system to be loaded onto the platform 400). In certain embodiments, the platform identifier is provided (e.g., via a system administrator) to the server boot and provisioning system 454 when the platform 400 is initially purchased. In certain embodiments, the platform identifier is sent by the platform 400 to the server boot and provisioning system 454, either upon request or before the server boot and provisioning system 454 requests the platform identifier.

The server boot and provisioning system 454 returns a boot image with at least a portion of the boot image or a tag associated with the boot image being signed with the private key. The platform 400 may also request credentials from the server boot and provisioning system 454. The server boot and provisioning system 454 acknowledges the credentials.

The platform boot and provisioning system 404 ensures that the signed portion or tag is valid by decrypting the signed portion or tag with the public key in certificate 402. If the signature on the portion or tag is determined to be valid, the platform boot and provisioning system 404 executes the boot image, requests a configuration profile from the server boot and provisioning system 454, receives the configuration profile, and applies the configuration in the configuration profile to storage devices.

In certain embodiments, the credentials from the server may be a signed manifest containing verification information for an indicated data object. The credentials are optional if a boot authorization check is currently not being required on platform 400 (e.g., Credentials.Data may be NULL). The signed manifest may consist of three parts grouped together: a manifest file, a signer's information file, and a signature block file. In certain embodiments, manifest files and signer's information files conform to a 72-byte line-length limit. Continuation lines (e.g., lines beginning with a single "space" character) may be used for lines longer than 72 bytes. Also, the manifest file and signer's information file may be in ASCII text files. In cases in which these files contain a base64 encoded string, the string is an ASCII string before base64 encoding.

In the following sample manifest file, text in parentheses provides a description of the text that appears in the signed manifest and text outside of parentheses appears as shown in the manifest. Also, the manifest file includes a section referring to a memory-type data object with a reserved name, and in the example below, the data object is a Boot Object to be verified. The following is an example of a manifest file in a signed manifest in accordance with certain embodiments:

Manifest-Version: 2.0
ManifestPersistentId: (base64 representation of a unique GUID)
Name: memory:BootObject
Digest-Algorithms: SHA-1
SHA-1-Digest: (base64 representation of a SHA-1 digest of the boot object)

In the manifest file, the line "Manifest-Version: 2.0" is a standard header line. As for line ManifestPersistentId: (base64 representation of a unique GUID)", the right-hand string is a unique GUID for each manifest file created. The GUID is a binary value that is base64 encoded, and base64 may be described as a simple encoding scheme for representing binary values that use only printing characters. The line "Name: memory:BootObject" identifies the section that carries the integrity data for the Boot Object. Note that the Boot Object is not found directly from this manifest. Instead, a caller verifying the Boot Object integrity loads the Boot Object into memory and specifies the memory location of the Boot Object explicitly to this verification function. The Digest line "Digest-Algorithms: SHA-1" enumerates the digest algorithms for which integrity data is included for the data object. For systems with DSA signing, SHA-1 hash, and 1024-bit key length, the digest algorithm is "SHA-1". For systems with RSA signing, MD5 hash, and 512-bit key length, the digest algorithm is "MD5". Multiple algorithms may be specified as a whitespace-separated list. For every digest algorithm listed, there is a corresponding digest line. The line "SHA-1-Digest: (base64 representation of a SHA-1 digest of the boot object)" gives the corresponding digest value for the data object, wherein the value is base64 encoded.

The signer's information file includes a section whose name matches the reserved data object section name of the section in the manifest file. This section in the signer's information file carries the integrity data for the corresponding section in the manifest file. The following is an example of a signer's information file in a signed manifest in accordance with certain embodiments:

Signature-Version: 2.0
SignerInformationPersistentId: (base64 representation of a unique GUID)
SignerInformationName: BIS_VerifiableObjectSignerInfoName
Name: memory:BootObject
Digest-Algorithms: SHA-1
SHA-1-Digest: (base64 representation of a SHA-1 digest of the corresponding manifest section)

The line "Signature-Version: 2.0" is a standard header line. As for the "SignerInformationPersistentId: (base64 representation of a unique GUID)", the left-hand string appears as shown, and the right-hand string is a unique GUID for every signer's information file created. The GUID is a binary value that us base64 encoded. As for the line "SignerInformationName: BIS_VerifiableObjectSignerInfoName", the left-hand string appears as shown, and the right-hand string appears as shown. The line "Name: memory:BootObject" identifies the section in the signer's information file corresponding to the section with the same name in the manifest file described earlier. The string "memory:BootObject" appears as shown. The Digest line "Digest-Algorithms: SHA-1" enumerates the digest algorithms for which integrity data is included for the corresponding manifest section. Strings identifying digest algorithms are the same as in the manifest file. The digest algorithms specified here match those specified in the manifest file. For every digest algorithm listed, there is also a corresponding Digest line. The line "SHA-1-Digest: (base64 representation of a SHA-1 digest of the corresponding manifest section)" provides the corresponding digest value for the corresponding manifest section, wherein the value is base64 encoded.

In certain embodiments, for the purpose of computing the hash of the manifest section, the manifest section starts at the beginning of the opening "Name:" keyword and continues up to, but not including, the next section's "Name:" keyword or the end-of-file. Thus the hash includes the blank line(s) at the end of a section and any newline(s) preceding the next "Name:" keyword or end-of-file.

A signature block file may be a raw binary file (i.e., not base64 encoded) that is a pre-defined format signature block. The signature block covers the contents of the signer's information file. There is a correspondence between the name of the signer's information file and the signature block file. The base name matches, and the three-character extension is modified to reflect the signature algorithm used according to the following rules: 1) DSA signature algorithm (which uses SHA-1 hash): extension is DSA and RSA signature algorithm with MD5 hash: extension is RSA. For example, with a signer's information file name of "myinfo.SF", the corresponding DSA signature block file name is "myinfo.DSA". The format of a signature block may be, for example, one that is defined by the Public Key Cryptography Standards, available from RSA Laboratories.

With reference to FIG. 4B, instead of a portion of the boot image or a tag associated with the boot image being signed, at least a portion of the credentials are signed. With reference to FIG. 4C, a separate DHCP/proxy DHCP server 470 is illustrated. Additionally, in the illustration of FIG. 4C, either a portion of the boot image, a tag associated with the boot image, and/or credentials may be signed.

Figure 5A:
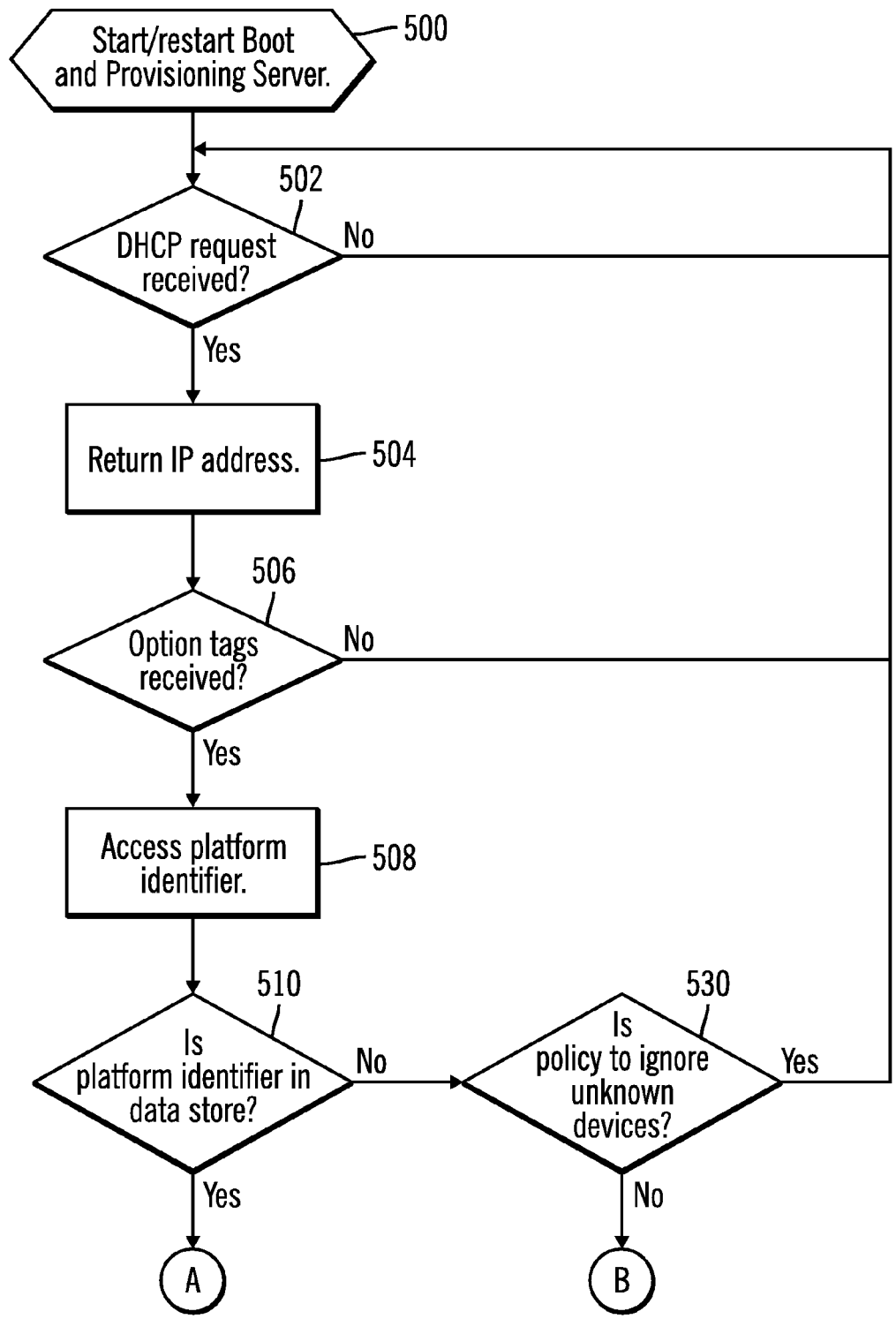
FIGS. 5A, 5B, and 5C illustrate operations performed at a boot and provisioning server in accordance with certain embodiments.
Figure 5B:
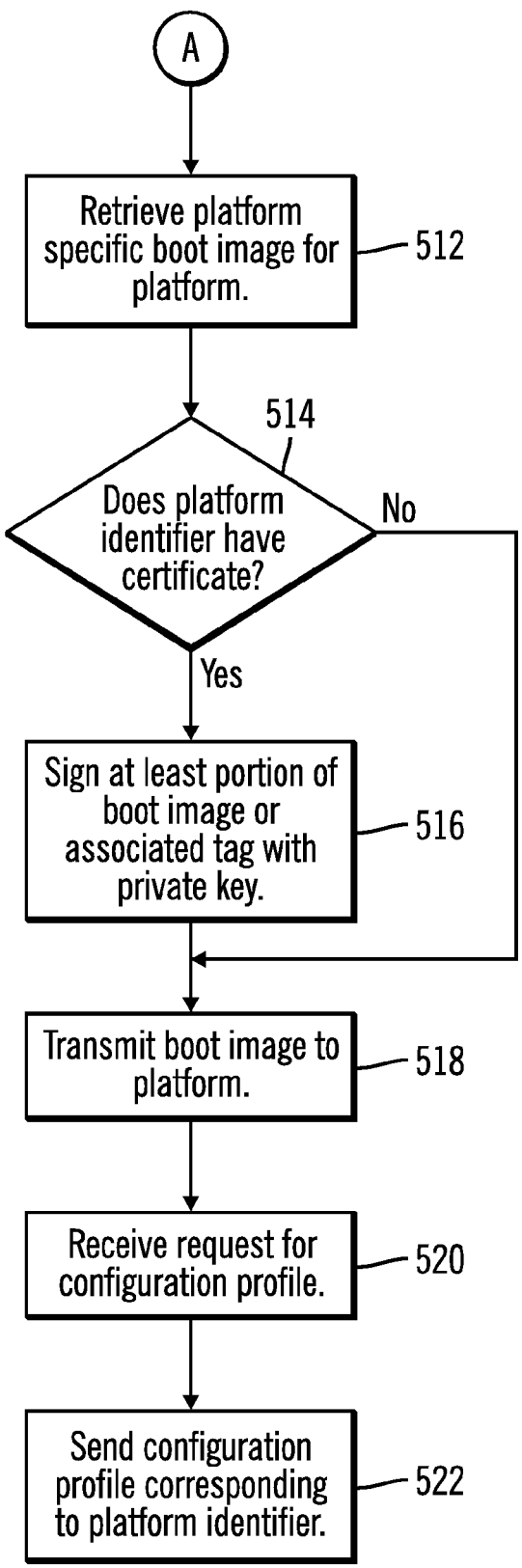
Figure 5C:
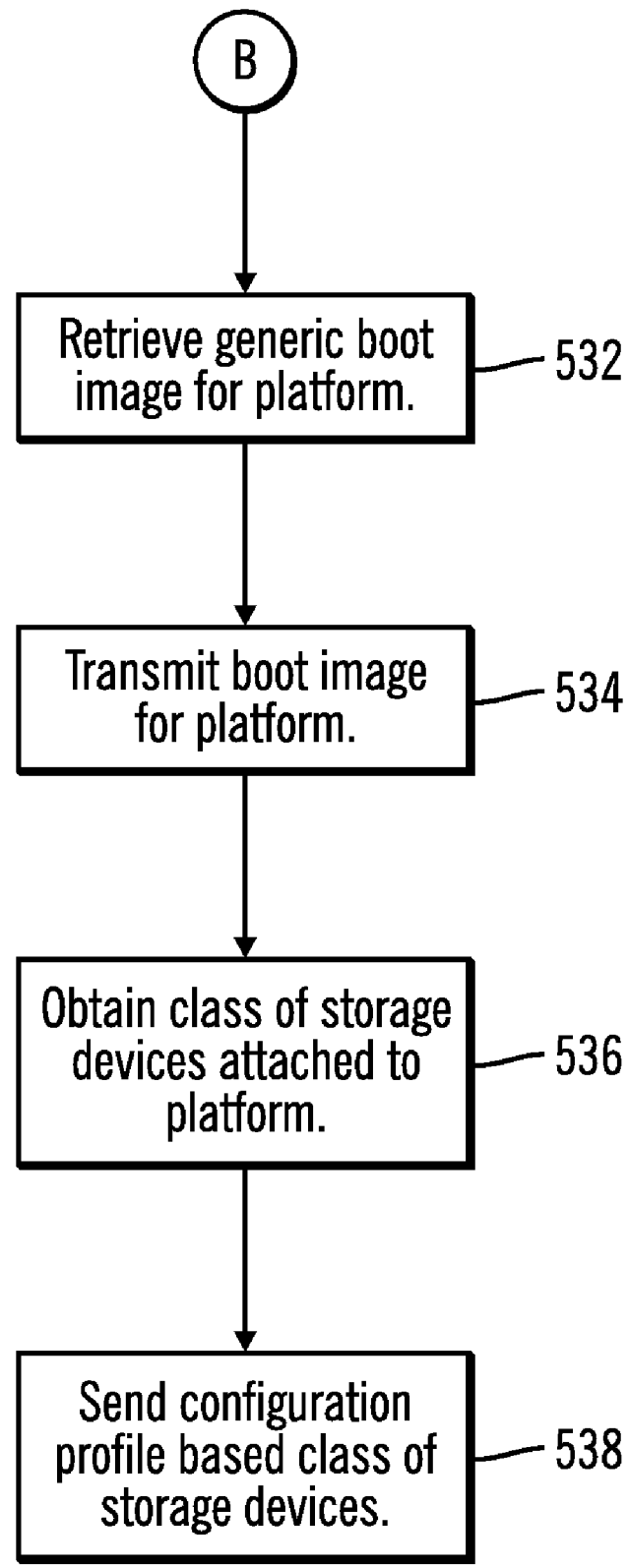

FIGS. 5A, 5B, and 5C illustrate operations performed at a boot and provisioning server 450 in accordance with certain embodiments. In FIG. 5A, control begins at block 500 with the server boot and provisioning system 454 being started or restarted. In block 502, the server boot and provisioning system 454 determines whether a DHCP request has been received. If so, processing continues to block 504, otherwise, processing loops back to block 502. Although the boot and provisioning server 450 is illustrated as processing the DHCP request, in certain alternative embodiments, the DHCP request is processed by a separate server 470.

In block 504, the server boot and provisioning system 454 returns an IP address in response to the DHCP request. In block 506, the server boot and provisioning system 454 determines whether option tags were received. In certain embodiments, the boot and provisioning server 450 may attempt to configure itself with, for example, a Multicast Boot Server Discovery address by executing a DHCPREQUEST or DHCPINFORM with an option tag #60 set to "PXEServer". The boot and provisioning server 450 expects to receive an option tag #60 "PXEServer" followed by tag

43 and subtag #7 (DISCOVERY_MCAST_ADDR) and subtag #11 (PXE_MCAST_ADDRS_ALLOC).

If option tags were received, processing continues to block 508, otherwise, processing loops back to block 502. In block 508, the server boot and provisioning system 454 accesses a platform identifier. In certain embodiments, the platform identifier is received as an option tag. In certain alternative embodiments, the server boot and provisioning system 454 requests the platform identifier from the platform 400.

In block 510, the server boot and provisioning system 454 determines whether the platform identifier is in data store 310 (i.e., whether the platform identifier is valid). If so, processing continues to block 512, otherwise, processing continues to block 530.

In block 512 (FIG. 5B), the server boot and provisioning system 454 retrieves a platform specific boot image for platform 400. In block 514, the server boot and provisioning system 454 determines whether the platform identifier has an associated certificate 402. If so, processing continues to block 516, otherwise, processing continues to block 518. In block 516, the server boot and provisioning system 454 signs at least a portion of the boot image (e.g., a packet making up the boot image) or a tag associated with the boot image with the private key 452. In block 518, the server boot and provisioning system 454 transmits the boot image to the platform 400.

In block 520, the server boot and provisioning system 454 receives a request for a configuration profile, and, in block 522, the server boot and provisioning system 454 sends the configuration profile that corresponds to the platform identifier to the platform 400.

In FIG. 5A, in block 530, the server boot and provisioning system 454 determines whether a policy has been implemented to ignore unknown storage devices (i.e., a platform 400 connected to storage devices, where the platform 400 does not have a known platform identifier). If so, processing loops back to block 502, otherwise, processing continues to block 532. In block 532 (FIG. 5C), the server boot and provisioning system 454 retrieves a generic boot image for platform 400. In block 534, the server boot and provisioning system 454 transmits the generic boot image to platform 400. In block 536, the server boot and provisioning system 454 obtains a class of the storage devices attached to the platform 400. The class, for example, may indicate the type of a network attached storage device, an amount of storage available on the storage device, or bandwidth associated with the storage device. In block 538, the server boot and provisioning system 454 sends a configuration profile to platform 400, where the configuration profile is selected based on the class of the storage devices. If there are different classes of storage devices connected to platform 400 (e.g., slow, fast, big, small, etc), various logic and/or heuristics may be used to select the configuration profile. The logic and/or heuristics may, for example, take an average of band-width/speed, split a RAID set across a smallest number of disks for one volume, make a second volume out of remainder storage, etc.

Figure 6A:
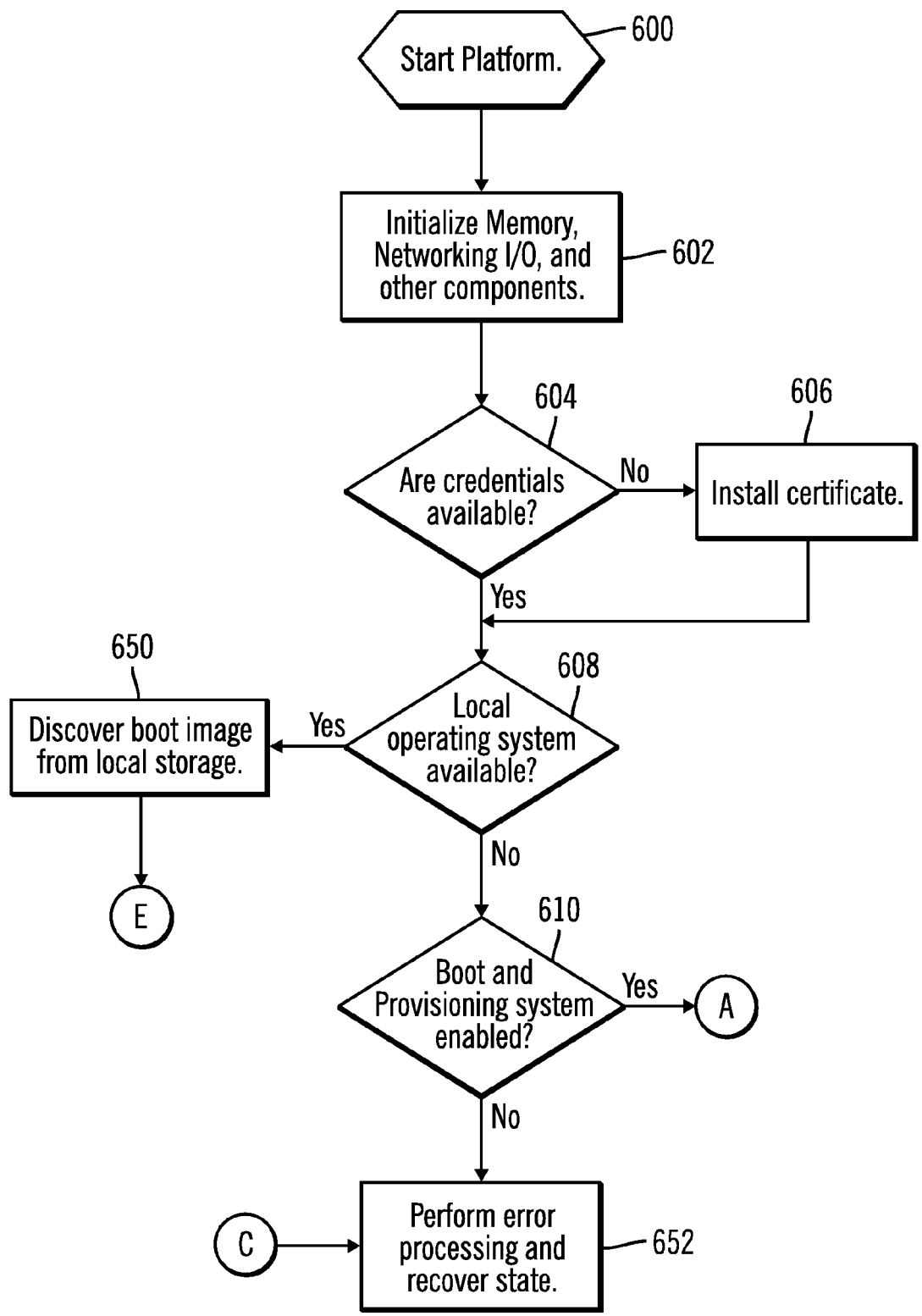
FIGS. 6A, 6B, 6C, and 6D illustrate operations performed at a storage server with I/O processor platform in accordance with certain embodiments.
Figure 6B:
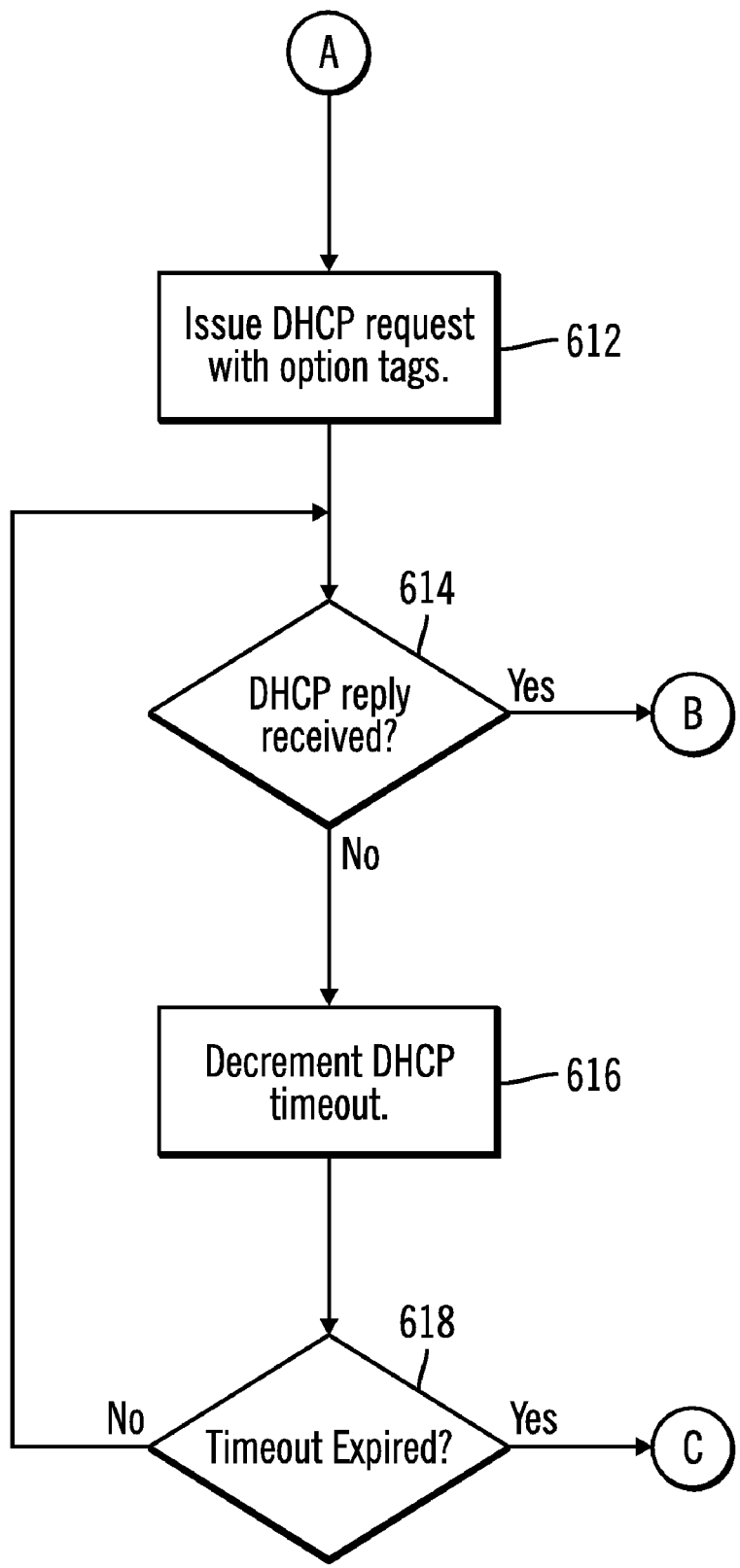
Figure 6C:
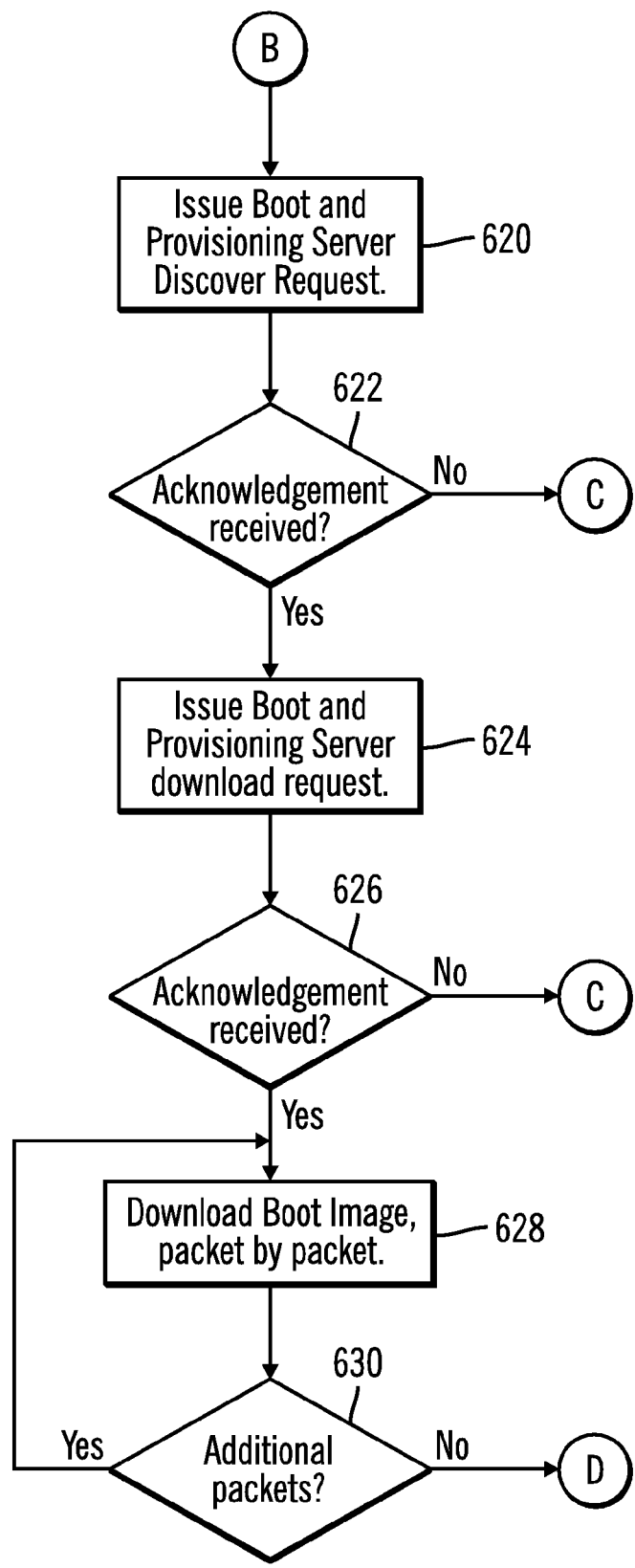
Figure 6D:
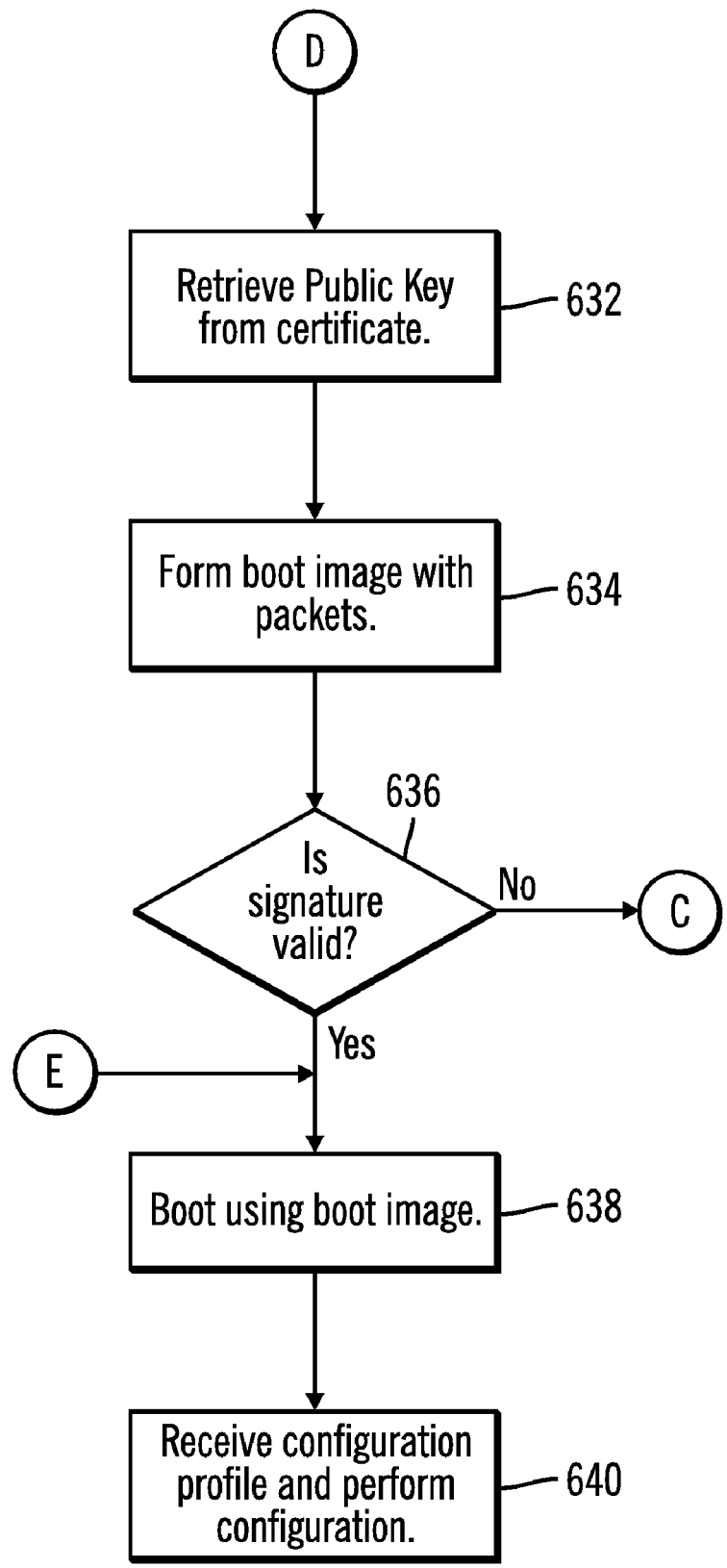

FIGS. 6A, 6B, 6C, and 6D illustrate operations performed at a storage server with I/O processor platform 400 in accordance with certain embodiments. In FIG. 6A, control begins at block 600 with the platform being started or restarted. In block 602, memory, network I/O, and other components (e.g., a timer, a phase lock loop (PLL), etc.) are initialized. In block 604, the I/O processor on platform 400 determines whether credentials are available. If not, processing continues to block 606, otherwise, processing continues to block 608. In block 606, a certificate 402 may be installed at the I/O processor in a tamper proof storage (e.g., 226) via, for example, a local console or a World Wide Web ("Web") interface. In block 608, the I/O processor on platform 400 determines whether a local operating system is available. If so, processing continues to block 650, otherwise, processing continues to block 610. In block 610, the I/O processor on platform 400 determines whether platform boot and provisioning system 404 is enabled to communicate with server boot and provisioning system 454. In embodiments in which server 400 is a PXE server, in block 404, it is determined whether firmware at the I/O processor is PXE enabled. If the platform boot and provisioning system 404 is enabled at platform 400, processing continues to block 612. In block 612 (FIG. 6B), the I/O processor on platform 400 issues a DHCP request with option tags. In block 614, the I/O processor on platform 400 determines whether a DHCP reply has been received. If so, processing continues to block 620 (FIG. 6B), otherwise processing continues to block 616. In block 616, the I/O processor on platform 400 decrements a DHCP timeout. In block 618, the I/O processor on platform 400 determines whether the timeout has expired. If so, processing continues to block 652, otherwise, processing loops back to block 614.

In block 620 (FIG. 6C), the I/O processor on platform 400 issues a boot and provisioning server discover request. In block 622, the I/O processor on platform 400 determines whether an acknowledgement of the discover request was received from the boot and provisioning server 400. If so, processing continues to block 624, otherwise, processing continues to block 652.

In block 624, the I/O processor on platform 400 issues a boot and provisioning server download request. In block 626, the I/O processor on platform 400 determines whether an acknowledgement of the download request was received. If so, processing continues to block 628, otherwise, processing continues to block 652. In block 628, the I/O processor on platform 400 downloads the boot image packet by packet. That is, the boot image is typically formed by multiple packets. In block 630, the I/O processor on platform 400 determines whether there are additional packets to download. If so, processing loops back to block 628, otherwise, processing continues to block 632. In block 632 (FIG. 6D), the I/O processor on platform 400 retrieves a public key from a certificate 402. In block 634, the I/O processor on platform 400 forms a boot image with the packets. In block 636, the I/O processor on platform 400 determines whether the signature is valid by decrypting a signed portion of the boot image or an associated tag. If the signature is valid, processing continues to block 638, otherwise, processing continues to block 652. In block 638, the I/O processor on platform 400 boots using the boot image. In block 640, the I/O processor on platform 400 receives a configuration profile and performs configuration on connected storage devices (e.g., NAS devices) using the configuration profile.

In block 650 (FIG. 6A), the I/O processor on platform 400 discovers a boot image in local storage and processing continues to block 638. In block 650, the I/O processor on platform 400 performs error processing and recovers state.

Thus in certain embodiments, the platform 400 (i.e., a type of client) provides a platform identity to the server boot and provisioning system 454. In certain embodiments, the platform 400 optionally only accepts signed boot images in order to guard against a rogue boot and provisioning server 450 from taking over storage platforms.

Figure 7:
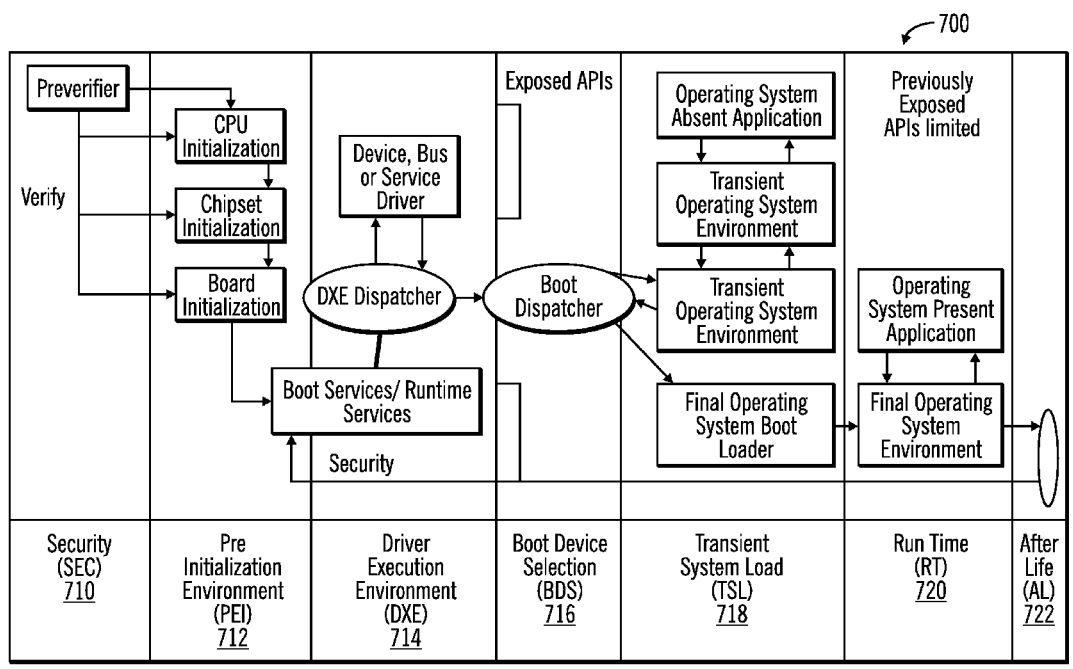
FIG. 7 illustrates a flow of processing in accordance with certain embodiments.

FIG. 7 illustrates a flow 700 of processing in accordance with certain embodiments. During a security phase 710, a preverifier verifies CPU initialization, chipset initialization, and board initialization that are occurring in a pre-initialization environment (PEI) phase 712. A boot services/runtime services block works with a Driver eXection Engine (DXE) dispatcher in a driver execution environment phase 714. During a boot device selection (BDS) phase 716, there are exposed APIs (e.g., EFI APIs) and a boot dispatcher starts processing a boot. In a transient system load (TSL) phase 718, an operating system absent application interacts with transient operating system environments and a final operating system boot loader executes. In a run time phase 720, the previously exposed APIs are limited and an operating system present application interacts with a final operating system environment. In an after life (AL) phase 722, other processing (e.g., security management) may occur.

In certain embodiments, hardware, firmware, and/or software are provided to support network-loading of an operating system into Random Access Memory of an I/O processor 210, with a small boot-loader in Flash memory.

Thus, embodiments provide a standards-based platform 400 for storage. Also, embodiments add root-of-trust flow to platform 400 start and restart. For example, the I/O processor 210 may include a small boot-loader (e.g., a platform boot and provisioning system 256) that loads firmware securely. Then, the networking stack of this firmware can use Boot Integrity Services (BIS) and associated public-key cryptographic signature to secure the boot image.

In certain embodiments, the platform boot and provisioning system 256, 404 is firmware that is bit-masked into ROM at the I/O processor 210 or loaded from the attached Flash memory 214. This firmware is capable of supporting the firmware flow illustrated in FIG. 7 in order to get to the TSL phase 718, which supports the operations performed by the platform 400 as illustrate in FIGS. 6A–6D. Also, since the firmware initializes a basic platform topology and supports a network load, the firmware may be a small layer, thus saving money on the platform cost by obviating the need for a large Flash memory 214 to support a large firmware stack and an operating system, whether the operating system be a Real Time Operating System (RTOS) or a full operating system (e.g., NetBSD). A network load may be described as a network-based retrieval and invocation of an operating system initial program loader or "boot-loader."

Certain embodiments use standard firmware interfaces and network protocols. Additionally, certain embodiments enable creation of a common infrastructure and make the NAS a commodity building-block in the spirit of the horizontal industry. The term "horizontal industry" may be described as a Network Attached Storage (NAS) device that has a standards-based mechanism for loading an operating system. The operating system does not have to be a Real-Time Operating System that is customized for the platform. Instead, the NAS can load any of a plurality of operating systems from different vendors, such as Windows®, Linux®, and NetBSD operating systems. This allows for provisioning logic to repurpose and reprovision the NAS based upon customer requirements, needs, etc. This is the essence of how the Personal Computer (PC) interoperates in the "horizontal" industry, where the industry is horizontal in that anyone may write an operating system for the PC since the means by which to construct a "boot loader" is well known.

Certain embodiments allow for the platform 400 to be updated to the needs of a customer. This is congruent with autonomic computing initiatives that address components that are capable of being updated and conforming to a system environment over time.

In certain embodiments, the I/O processor 210 is a System On a Chip (SOC). The I/O processor 210 is capable of booting and exposing standard based interfaces. Also, the storage server with I/O processor platform 400 may be described as a generic node that can be re-provisioned and personalized at any stage: in the factory, at the point-of-sale, upon first install, and any other time during the platform 400 deployment.

Also, in certain embodiments, the platform 400 is capable of self-healing. That is, updates or fixes may be rapidly deployed to the platform 400 via a configuration profile 320. Also, new features for the storage protocol or manageability code may be added at any point.

In certain embodiments, the I/O processor 210 uses DHCP and TFTP firmware flows to support secure provisioning of network-attached standard-based storage in a scale-out computing environment.

In certain embodiments, remote booting of network-attached storage consisting of I/O processors and associated managed storage is provided. In certain embodiments, standards-based firmware, such as the Extensible Firmware Interface (EFI) Specification and a Pre-boot Execution Environment (PXE), are used to provide network boot support to initialize the server with I/O processor platform 400. Certain embodiments allow for EFI-based Manufacturing Test Architecture (MTA) applications to be remotely loaded.

The EFI specification defines a model for the interface between operating systems and platform firmware. The interface consists of data tables that contain platform-related information, plus boot and runtime service calls that are available to the operating system and its loader. Together, these provide a standard environment for booting an operating system and running pre-boot applications.

PXE is an open industry standard developed by a number of software and hardware vendors. PXE transfers a boot image (e.g., a file) to a system, and the system may then boot up with the boot image. The boot image may be, for example, an operating system or a pre-operating system agent that performs client management tasks.

In certain embodiments, the network-load process may be secured via a Basic Input Output System (BIOS) Integrity Services in EFI.

Intel and XScale are registered trademarks and/or common law marks of Intel Corporation in the United States and/or foreign countries. Windows is a registered trademark and/or common law mark of Microsoft Corporation in the United States and/or foreign countries. Linux is a registered trademark of Linus Torvalds in the United States and/or other countries. Redboot is a registered trademark and/or common law mark of Red Hat, Inc. in the United States and/or foreign countries.

ADDITIONAL EMBODIMENT DETAILS

The described techniques for secure booting and provisioning may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art recognize that many modifications may be made to this configuration without departing from the scope of embodiments, and that the article of manufacture may comprise any information bearing medium known in the art.

The illustrated logic of FIGS. 5A–5C and 6A–6D show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 8:
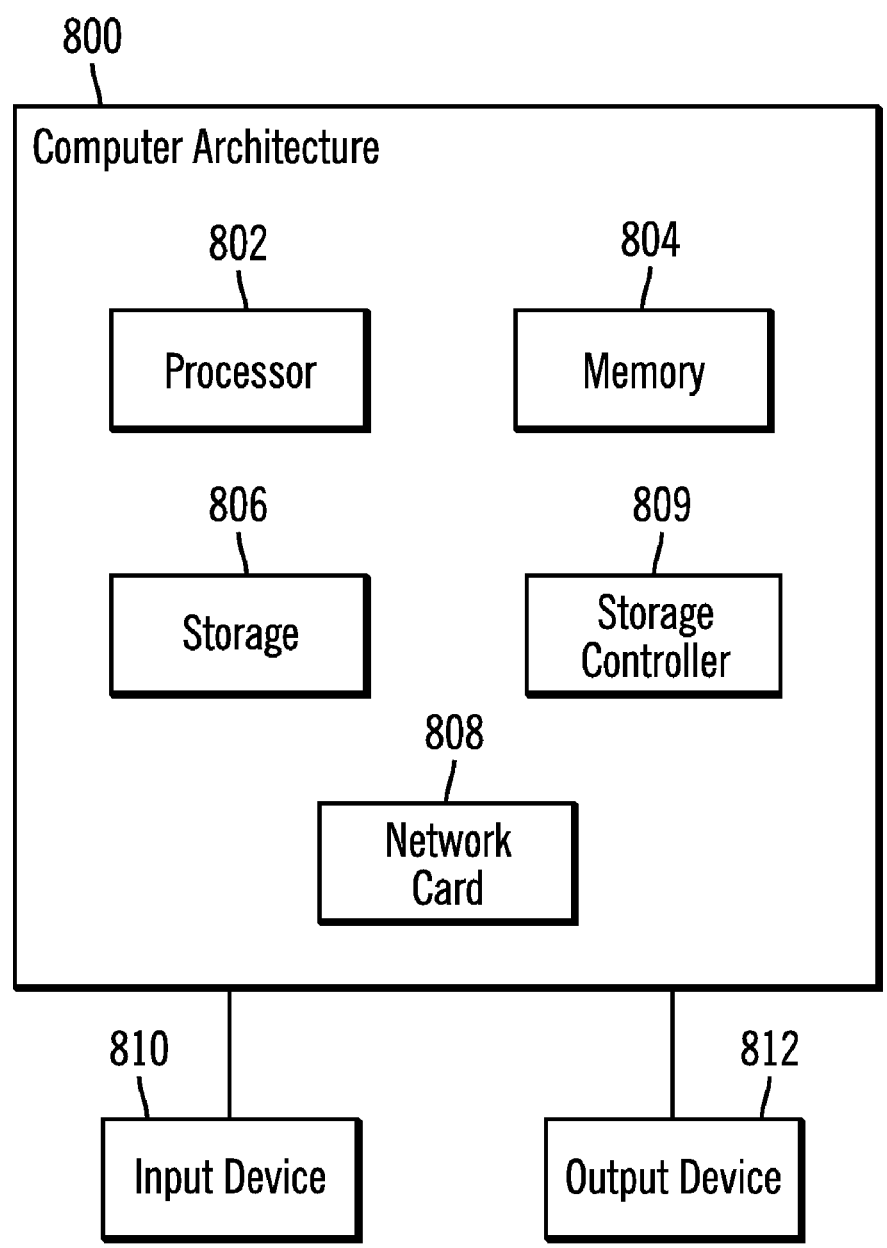
FIG. 8 illustrates one embodiment of a computer system.

FIG. 8 illustrates one embodiment of computer system 800. The system 800 may include a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The system further includes a network card 808 to enable communication with a network, such as an Ethernet, a Fibre Channel Arbitrated Loop, etc. Further, the system may, in certain embodiments, include a storage controller 809. As discussed, certain of the network devices may have multiple network cards. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

The foregoing description of various embodiments has been presented for the purposes of illustration and description. It is not intended to be exhaustive or to limit the embodiments to the precise forms disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments can be made without departing from the spirit and scope of the embodiments, the embodiments reside in the claims hereinafter appended.

What is claimed is:

1. A method for booting and provisioning a platform connected to a boot and provisioning server including a server boot and provisioning system, comprising:

receiving a platform identifier;

selecting a platform specific boot image from a set of platform specific boot images based on the platform identifier in response to determining that the platform identifier is valid;

selecting a platform specific configuration profile based on the platform identifier in response to determining that the platform identifier is valid, wherein the platform specific configuration profile is used to configure one or more storage devices using a prescribed policy; and selecting a configuration profile by obtaining a class of storage devices attached to the platform and selecting the configuration profile based on the class of the storage devices in response to determining that the platform identifier is not valid, wherein the configuration profile is used to configure one or more storage devices using a prescribed policy.

2. The method of claim 1, further comprising:
selecting a generic boot image in response to determining that the platform identifier is not valid.

3. The method of claim 1, further comprising:
signing at least a portion of the boot image or an associated tag with a private key.

4. The method of claim 1, farther comprising:
signing at least a portion of credentials.

5. The method of claim 1, receiving a request with option tags.

6. A method for booting and provisioning a platform connected to a boot and provisioning server, wherein the platform includes a platform boot and provisioning system, comprising:

issuing a request with option tags in response to determining that the platform is enabled to interact with a boot and provisioning server;

issuing a download request to obtain a boot image;

executing the boot image in response to determining that a signature of the boot image is valid;

requesting a configuration profile, wherein the configuration profile is used to configure one or more storage devices using a prescribed policy; and receiving the configuration profile, wherein, when a platform identifier associated with the platform is valid, the configuration profile is selected based on the platform identifier and, when the platform identifier is not valid, the configuration profile is selected by obtaining a class of storage devices attached to the platform and selecting the configuration profile based on the class of the storage devices.

7. The method of claim 6, farther comprising:
configuring storage devices connected to the platform using the configuration profile.

8. The method of claim 6, farther comprising:
discovering a local boot image in response to determining that a local operating system is available.

9. A system in communication with data storage, comprising:

a platform including an Input/Output (I/O) processor;

a storage controller managing Input/Output (I/O) access to the data storage;

a boot and provisioning server including a sewer boot and provisioning system connected to the platform, wherein the server boot and provisioning system is capable of receiving a platform identifier, selecting a platform specific boot image from a set of platform specific boot images based on the platform identifier in response to determining that the platform identifier is valid, selecting a platform specific configuration profile based on the platform identifier in response to determining that the platform identifier is valid, wherein the platform specific configuration profile is used to configure one or more storage devices using a prescribed policy, and selecting a configuration profile by obtaining a class of storage devices attached to the platform and selecting the configuration profile based on the class of the storage devices in response to determining that the platform identifier is not valid, wherein the configuration profile is used to configure one or more storage devices using a prescribed policy.

10. The system of claim 9, wherein the sewer boot and provisioning system is capable of selecting a generic boot image in response to determining that the platform identifier is not valid.

11. The system of claim 9, wherein the sewer boot and provisioning system is capable of signing at least a portion of the boot image or an associated tag with a private key.

12. The system of claim 9, wherein the sewer boot and provisioning system is capable of signing at least a portion of credentials.

13. The system of claim 9, wherein the server boot and provisioning system is capable of receiving a request with option tags.

14. A system coupled to a network and data storage, comprising:
   a platform including an Input/Output (I/O) processor;
   a storage controller managing Input/Output (I/O) access to the data storage;
   a platform boot and provisioning system at the platform, wherein the platform boot and provisioning system is capable of issuing a request with option tags in response to determining that the platform is enabled to interact with a boot and provisioning server, issuing a download request to obtain a boot image, executing the boot image in response to determining that a signature of the boot image is valid, requesting a configuration profile, and receiving the configuration profile, wherein, when a platform identifier associated with the platform is valid, the configuration profile is selected based on the platform identifier and, when the platform identifier is not valid, the configuration profile is selected by obtaining a class of storage devices attached to the platform and selecting the configuration profile based on the class of the storage devices, and, wherein the configuration profile is used to configure one or more storage devices using a prescribed policy.

15. The system of claim 14, wherein the platform boot and provisioning system is capable of configuring storage devices connected to the platform using the configuration profile.

16. The system of claim 14, wherein the platform boot and provisioning system is capable of discovering a local boot image in response to determining that a local operating system is available.

17. An article of manufacture comprising a storage medium having stored therein instructions that when executed by a computing device results in the following:
   receiving a platform identifier;
   selecting a platform specific boot image from a set of platform specific boot images based on the platform identifier in response to determining that the platform identifier is valid; and
   selecting a platform specific configuration profile based on the platform identifier in response to determining that the platform identifier is valid, wherein the platform specific configuration profile is used to configure one or more storage devices using a prescribed policy; and
   selecting a configuration profile by obtaining a class of storage devices attached to the platform and selecting the configuration profile based on the class of the storage devices in response to determining that the platform identifier is not valid, wherein the configuration profile is used to configure one or more storage devices using a prescribed policy.

18. The article of manufacture of claim 17, wherein the instructions when executed further result in the following:
   selecting a generic boot image in response to determining that the platform identifier is not valid.

19. The article of manufacture of claim 17, wherein the instructions when executed further result in the following:
   signing at least a portion of the boot image or an associated tag with a private key.

20. The article of manufacture of claim 17, wherein the instructions when executed farther result in the following:
   signing at least a portion of credentials.

21. The article of manufacture of claim 17, wherein the instructions when executed farther result in the following:
   receiving a request with option tags.

22. An article of manufacture comprising a storage medium having stored therein instructions that when executed by a computing device results in the following:
   issuing a request with option tags in response to determining that the platform is enabled to interact with a boot and provisioning server;
   issuing a download request to obtain a boot image;
   executing the boot image in response to determining that a signature of the boot image is valid;
   requesting a configuration profile, wherein the configuration profile is used to configure one or more storage devices using a prescribed policy; and
   receiving the configuration profile, wherein, when a platform identifier associated with the platform is valid, the configuration profile is selected based on the platform identifier and, when the platform identifier is not valid, the configuration profile is selected by obtaining a class of storage devices attached to the platform and selecting the configuration profile based on the class of the storage devices.

23. The article of manufacture of claim 22, wherein the instructions when executed further result in the following:
   configuring storage devices connected to the platform using the configuration profile.

24. The article of manufacture of claim 22, wherein the instructions when executed further result in the following:
   discovering a local boot image in response to determining that a local operating system is available.

* * * * *